(12) United States Patent
Kikkawa

(10) Patent No.: US 8,209,296 B2
(45) Date of Patent: Jun. 26, 2012

(54) INFORMATION PROCESSING APPARATUS, DIVIDED MANAGEMENT SERVER, INFORMATION PROCESSING METHOD, DIVIDED MANAGEMENT METHOD, PROGRAM AND INFORMATION PROCESSING SYSTEM

(75) Inventor: Norifumi Kikkawa, Tokyo (JP)

(73) Assignee: Sony Corporation, Tokyo (JP)

( * ) Notice: Subject to any disclaimer, the term of this patent is extended or adjusted under 35 U.S.C. 154(b) by 279 days.

(21) Appl. No.: 12/621,611

(22) Filed: Nov. 19, 2009

(65) Prior Publication Data

US 2010/0138396 A1   Jun. 3, 2010

(30) Foreign Application Priority Data

Dec. 3, 2008 (JP) ................................. P2008-308800

(51) Int. Cl.
*G06F 17/00* (2006.01)
(52) U.S. Cl. ........................................................ 707/674
(58) Field of Classification Search .................. 707/609, 707/674, 705, 741, 790, 802, 813
See application file for complete search history.

(56) References Cited

U.S. PATENT DOCUMENTS

| | | | | | |
|---|---|---|---|---|---|
| 4,891,785 | A | * | 1/1990 | Donohoo | 709/217 |
| 5,892,921 | A | * | 4/1999 | Murakami et al. | 709/234 |
| 5,909,693 | A | * | 6/1999 | Martini | 711/114 |
| 6,378,031 | B1 | * | 4/2002 | Kuno et al. | 711/4 |
| 6,993,536 | B2 | * | 1/2006 | Yamanaka | 1/1 |

FOREIGN PATENT DOCUMENTS

| | | |
|---|---|---|
| JP | 2004-126716 | 4/2004 |
| JP | 2007-73004 | 3/2007 |

* cited by examiner

*Primary Examiner* — Fred I Ehichioya
(74) *Attorney, Agent, or Firm* — Finnegan, Henderson, Farabow, Garrett & Dunner, L.L.P.

(57) ABSTRACT

There is provided an information processing apparatus including a blocking unit that acquires holding block information, which is information about blocks to be held by a local apparatus, about a data file divided into a plurality of blocks among other information processing apparatuses excluding the local apparatus for divided management and held by the local apparatus and divides the data file to be held by the local apparatus based on the holding block information; and a storage unit that records the blocks of the data file identified by the holding block information with the blocks associated with data file identification information, which is information to identify the data file.

16 Claims, 18 Drawing Sheets

FIG.11

| FILE ID (HASH VALUE) | NODE | NODE ID | RESPONSIBLE BLOCK |
|---|---|---|---|
| H1 | INFORMATION PROCESSING APPARATUS A | ○○○○ | A,B |
| H1 | INFORMATION PROCESSING APPARATUS B | ××× × | C,D |
| H1 | INFORMATION PROCESSING APPARATUS C | △△△△ | A,E |
| H1 | INFORMATION PROCESSING APPARATUS D | ○×○× | B,D |
| H1 | INFORMATION PROCESSING APPARATUS E | ○△○△ | C,E |
| H2 | INFORMATION PROCESSING APPARATUS F | ×△×△ | ... |
| H2 | INFORMATION PROCESSING APPARATUS G | ○△○△ | ... |

INFORMATION PROCESSING APPARATUS, DIVIDED MANAGEMENT SERVER, INFORMATION PROCESSING METHOD, DIVIDED MANAGEMENT METHOD, PROGRAM AND INFORMATION PROCESSING SYSTEM

BACKGROUND OF THE INVENTION

1. Field of the Invention

The present invention relates to an information processing apparatus, a divided management server, an information processing method, a divided management method, a program, and an information processing system.

2. Description of the Related Art

In recent years, data backup and integrity has been sought by distributing data using a Peer-to-Peer (P2P) network and arranging data in a network-connected information processing apparatus (see, for example, Japanese Patent Application Laid-Open No. 2004-126716 and Japanese Patent Application Laid-Open No. 2007-73004). Methods described in Japanese Patent Application Laid-Open No. 2004-126716 and Japanese Patent Application Laid-Open No. 2007-73004 relate to technology to construct one storage device in collaboration among a plurality of node devices.

SUMMARY OF THE INVENTION

However, according to methods described in Japanese Patent Application Laid-Open No. 2004-126716 and Japanese Patent Application Laid-Open No. 2007-73004, there is an issue that even if an owner's concept is contained in a data file, an owner's node is distributed and arranged regardless of which node is the owner's node. Consider, for example, a system in which every data file has its owner. In this case, using a storage of a node, which is an owner of many data files, and a storage of a node, which is an owner of few data files, uniformly is unfair in view of a case in which the node administrators are not the same.

Moreover, some systems maintain data files of the same content on a plurality of nodes, but distributed arrangement of data files of the same content on the plurality of nodes is highly likely to lead to more waste.

The present invention has been made in view of the above issues and it is desirable to provide a novel and improved information processing apparatus, divided management server, information processing method, divided management method, program, and information processing system capable of fairly dividing a data file for management among a plurality of apparatuses.

According to an embodiment of the present invention, there is provided an information processing apparatus including a blocking unit that acquires holding block information, which is information about blocks to be held by a local apparatus, about a data file divided into a plurality of blocks among other information processing apparatuses excluding the local apparatus for divided management and held by the local apparatus and divides the data file to be held by the local apparatus based on the holding block information, and a storage unit that records the blocks of the data file identified by the holding block information with the blocks associated with data file identification information, which is information to identify the data file.

According to the above configuration, the blocking unit acquires holding block information about a data file divided into a plurality of blocks among other information processing apparatuses excluding the local apparatus for divided management and held by the local apparatus and divides the data file to be held by the local apparatus based on the holding block information. The storage unit has the blocks of the data file identified by the holding block information with the blocks recorded therein by being associated with data file identification information, which is information to identify the data file.

The information processing apparatus preferably further includes a data file division condition information acquisition unit that acquires data file division condition information representing division conditions of the data file held by the local apparatus among other information processing apparatuses holding the data file from a predetermined data file division condition database, a non-holding block acquisition unit that acquires data files of the blocks not held by the local apparatus from among the plurality of blocks from the other information processing apparatuses, and a data file restoration unit that restores the data file using the data files corresponding to non-holding blocks acquired by the non-holding block acquisition unit and data files corresponding to blocks held by the local apparatus. The data file division condition information acquisition unit preferably acquires the data file division condition information about the data file to be restored from the data file division condition database and the non-holding block acquisition unit preferably acquires non-holding blocks from the other information processing apparatuses based on the data file division condition information about the data file to be restored.

The plurality of blocks is preferably held by the local apparatus and the other information processing apparatuses by providing redundancy.

A data size $D_{CX}$ of the blocks held by the local apparatus may be a size calculated based on Formula 1 below.

$$D_{CX} = \left(\beta - \frac{\beta - 1}{N_C}\right) \times \frac{D_C}{N_C} \quad \text{(Formula 1)}$$

$D_{CX}$ in Formula 1 above is the data size of the blocks held by the local apparatus, $N_C$ is a number of information processing apparatuses including the local apparatus holding a data file C, $\beta$ is a redundancy coefficient ($\beta>1$), and $D_C$ is the data size of the data file C.

A data size $D_{CX}$ of the blocks held by the local apparatus may be a size calculated based on Formula 2 below $$D_{CX} = \{(N_C - \beta_N) \cdot \alpha_X + \beta_N\} \times \frac{D_C}{N_C} \quad \text{(Formula 2)}$$

$$\beta_N = \beta - \frac{\beta - 1}{N_C} \quad \text{(Formula 3)}$$

$D_{CX}$ in Formula 2 above is the data size of blocks held by the local apparatus, $N_C$ is a number of information processing apparatuses including the local apparatus holding a data file C, $\alpha_X$ is a utilization frequency ($0 \leq \alpha_X \leq 1$) of the data file C by the local apparatus, $\beta_N$ is a redundancy coefficient calculated by Formula 3 using a redundancy coefficient ($\beta>1$), and $D_C$ is the data size of the data file C.

The data file division condition database may be held by a divided management server to which the local apparatus and the other information processing apparatuses can be connected.

The data file division condition database may be held by the local apparatus and the other information processing apparatuses by being divided.

The data file division condition database may be held by the local apparatus and the other information processing apparatuses by being divided using a distributed hash table.

The information processing apparatus preferably holds a route table concerning the data file division condition database held by each of the local apparatus and the other information processing apparatuses and identifies the other information processing apparatuses holding the non-holding blocks using the data file identification information of the data file to be restored and unique identifies assigned to the local apparatus and the other information processing apparatuses in advance.

The information processing apparatus may further include an authentication unit that, when an acquisition request of the block held by the local apparatus is transmitted from the other information processing apparatus, authenticates the other information processing apparatus based on whether the other information processing apparatus holds the data file in a suitable format. The authentication unit may authenticate the other information processing apparatus by digest authentication using the holding block information.

The authentication unit may decide a parameter R randomly and transmits information to identify at least a portion of the data file held by the local apparatus and corresponding to a block that should be held by the other information processing apparatus that transmitted the acquisition request of the block and the parameter R to the other information processing apparatus that made the acquisition request of the block, and compare a hash value calculated by the other information processing apparatus that transmitted the acquisition request of the block by using the transmitted information to identify at least a portion of the data file and the parameter R and a hash value calculated by the local apparatus by using the transmitted information to identify at least a portion of the data file and the parameter R.

The authentication unit may acquire the holding block information about the blocks that should be held by the other information processing apparatus that transmitted the acquisition request of the block and information about a third information processing apparatus holding a block that should be held by the other information processing apparatus from the data file division condition database, transmit a randomly decided parameter R to the other information processing apparatus and the third information processing apparatus and makes a request to calculate a hash value using the parameter R and at least a portion of the block held by each of the other information processing apparatus and the third information processing apparatus, and compare the hash value transmitted from the other information processing apparatus and the hash value transmitted from the third information processing apparatus.

The data file identification information may be a hash value of the data file.

The information processing apparatus may be a storage device that manages data files.

The information processing apparatus may automatically perform blocking processing of all data files held by the local apparatus.

According to another embodiment of the present invention, there is provided a divided management server including a storage unit in which a data file division condition database concerning division conditions of a data file divided for management among a plurality of information processing apparatuses is recorded, a division condition change unit that, when a join request to divided management of the data file is transmitted from one information processing apparatus, changes the division conditions of the data file requested to join in and managed by being divided into a plurality of blocks and updates the data file division condition database, and a holding block information transmission unit that transmits holding block information, which is information about the blocks to be held, to the information processing apparatuses whose division conditions have changed based on the division conditions of the data file after being changed.

The data file division condition database preferably contains at least data file identification information, which is information to identify the data file divided for management, information to identify the information processing apparatus holding the data file, and information to identify the blocks held by each of the information processing apparatuses holding the data file.

The division condition change unit preferably changes the blocks that should be held by each of the plurality of information processing apparatuses in accordance with preset redundancy.

The division condition change unit may set a data size $D_{CX}$ of the blocks held by each of the plurality of information processing apparatuses to a size calculated based on Formula 1 below.

$$D_{CX} = \left(\beta - \frac{\beta-1}{N_C}\right) \times \frac{D_C}{N_C} \quad \text{(Formula 1)}$$

$D_{CX}$ in Formula 1 above is the data size of the blocks held by each of the information processing apparatuses, $N_C$ is a number of information processing apparatuses holding a data file C, $\beta$ is a redundancy coefficient ($\beta>1$), and $D_C$ is the data size of the data file C.

The division condition change unit may set a data size $D_{CX}$ of the blocks held by each of the plurality of information processing apparatuses to a size calculated based on Formula 2 below.

$$D_{CX} = \{(N_C - \beta_N)\cdot\alpha_X + \beta_N\} \times \frac{D_C}{N_C} \quad \text{(Formula 2)}$$

$$\beta_N = \beta - \frac{\beta-1}{N_C} \quad \text{(Formula 3)}$$

$D_{CX}$ in Formula 2 above is the data size of blocks held by each of the information processing apparatuses, $N_C$ is a number of information processing apparatuses holding a data file C, $\alpha_X$ is a utilization frequency ($0 \leq \alpha_X \leq 1$) of the data file C by the information processing apparatus, $\beta_N$ is a redundancy coefficient calculated by Formula 3 using a redundancy coefficient ($\beta>1$), and $D_C$ is the data size of the data file C.

The divided management server preferably further includes a data file division condition information transmission unit that, when an acquisition request of data file division condition information, which is information representing division conditions of the data file, is transmitted from the information processing apparatus, transmits the relevant data file division condition information to the information processing apparatus.

According to another embodiment of the present invention, there is provided an information processing method including the steps of acquiring holding block information, which is information about blocks to be held by a local apparatus, about a data file divided into a plurality of blocks among other information processing apparatuses excluding the local apparatus for divided management and held by the local apparatus and dividing the data file to be held by the local apparatus based on the holding block information, and storing the blocks of the data file identified by the holding block information with the blocks associated with data file identification information, which is information to identify the data file.

According to another embodiment of the present invention, there is provided a divided management method including the steps of when a join request to divided management of a data file is transmitted from one information processing apparatus, referring to a data file division condition database concerning division conditions of the data file divided for management among a plurality of information processing apparatuses regarding the data file requested to join in, changing the division conditions of the data file managed by being divided into a plurality of blocks and updating the data file division condition database, and transmitting holding block information, which is information about the blocks to be held, to the information processing apparatuses whose division conditions have changed based on the division conditions of the data file after being changed.

According to another embodiment of the present invention, there is provided a program for causing a computer communicable with other information processing apparatuses to realize a blocking function to acquire holding block information, which is information about blocks to be held by a local apparatus, about a data file divided into a plurality of blocks among other information processing apparatuses excluding the local apparatus for divided management and held by the local apparatus and to divide the data file to be held by the local apparatus based on the holding block information, and a recording function to record the blocks of the data file identified by the holding block information with the block associated with data file identification information, which is information to identify the data file.

According to the above configuration, the computer program causes a computer to function as the above information processing apparatus by being stored in a storage unit contained in the computer and read and executed by a CPU contained in the computer. Alternatively, a computer readable recording medium in which the computer program is stored can be provided. The recording medium is, for example, a magnetic disk, optical disk, magneto-optical disk, or flash memory. Instead of using a recording medium, the above computer program may be delivered via a network.

According to another embodiment of the present invention, there is provided a program for causing a computer communicable with a plurality of information processing apparatuses to realize a management function to manage a data file division condition database concerning division conditions of a data file divided for management among the plurality of information processing apparatuses, a division condition change function that, when a join request to divided management of the data file is transmitted from one information processing apparatus, changes the division conditions of the data file requested to join in and managed by being divided into a plurality of blocks and updates the data file division condition database, and a holding block information transmission function that transmits holding block information, which is information about the blocks to be held, to the information processing apparatuses whose division conditions have changed based on the division conditions of the data file after being changed.

According to the above configuration, the computer program causes a computer to function as the above divided management server by being stored in a storage unit contained in the computer and read and executed by a CPU contained in the computer. Alternatively, a computer readable recording medium in which the computer program is stored can be provided. The recording medium is, for example, a magnetic disk, optical disk, magneto-optical disk, or flash memory. Instead of using a recording medium, the above computer program may be delivered via a network.

According to another embodiment of the present invention, there is provided an information processing system including the information processing apparatus and the divided management server.

According to the present invention as described above, a data file can be fairly divided for management among a plurality of apparatuses.

BRIEF DESCRIPTION OF THE DRAWINGS

FIG. 11 is an explanatory view exemplifying a data file division condition database;

DETAILED DESCRIPTION OF THE EMBODIMENTS

Figure 1:
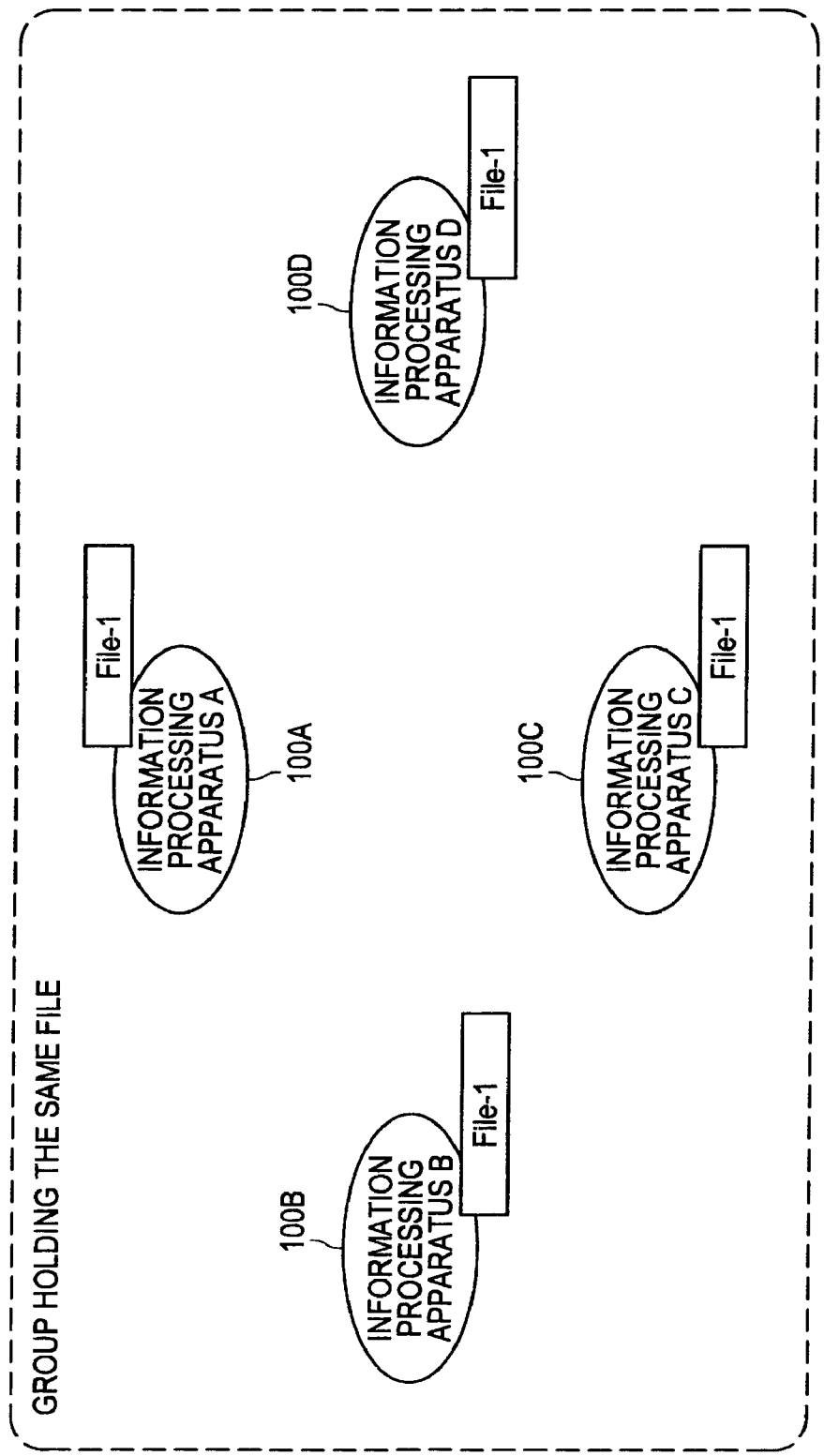
FIG. 1 is an explanatory view illustrating an overview of an information processing system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be provided in the order shown below.
(1) First Embodiment
　(1-1) Overview of Information Processing System
　(1-2) About Information Processing System
　(1-3) Configuration of Information Processing Apparatus
　(1-4) Configuration of Divided Management Server
　(1-5) Information Processing Method and Divided Management Method
　(1-6) First Modification
(2) Hardware Configuration of Comment Management Server and Data Processing Apparatus According to Each Embodiment of the Present Invention
(3) Summary (First Embodiment)
<Overview of Information Processing System>

First, an overview of an information processing system according to the first embodiment of the present invention will be described in detail with reference to FIGS. 1 to 8. FIGS. 1 to 8 are explanatory views providing an overview of an information processing system according to the present embodiment.

A situation in which each of a plurality of information processing apparatuses 100A to 100D individually holds the same data file (File-1 in FIG. 1) can frequently arise as shown in FIG. 1. If a plurality of information processing apparatuses having a data file of the same content is present, an occupancy rate of storage device such as a hard disk will be lower when, as shown, for example, in FIG. 2, a data file is held by sharing the file among the plurality of apparatuses than when, as shown in FIG. 1, the data file is held by individual apparatuses.

Figure 2:
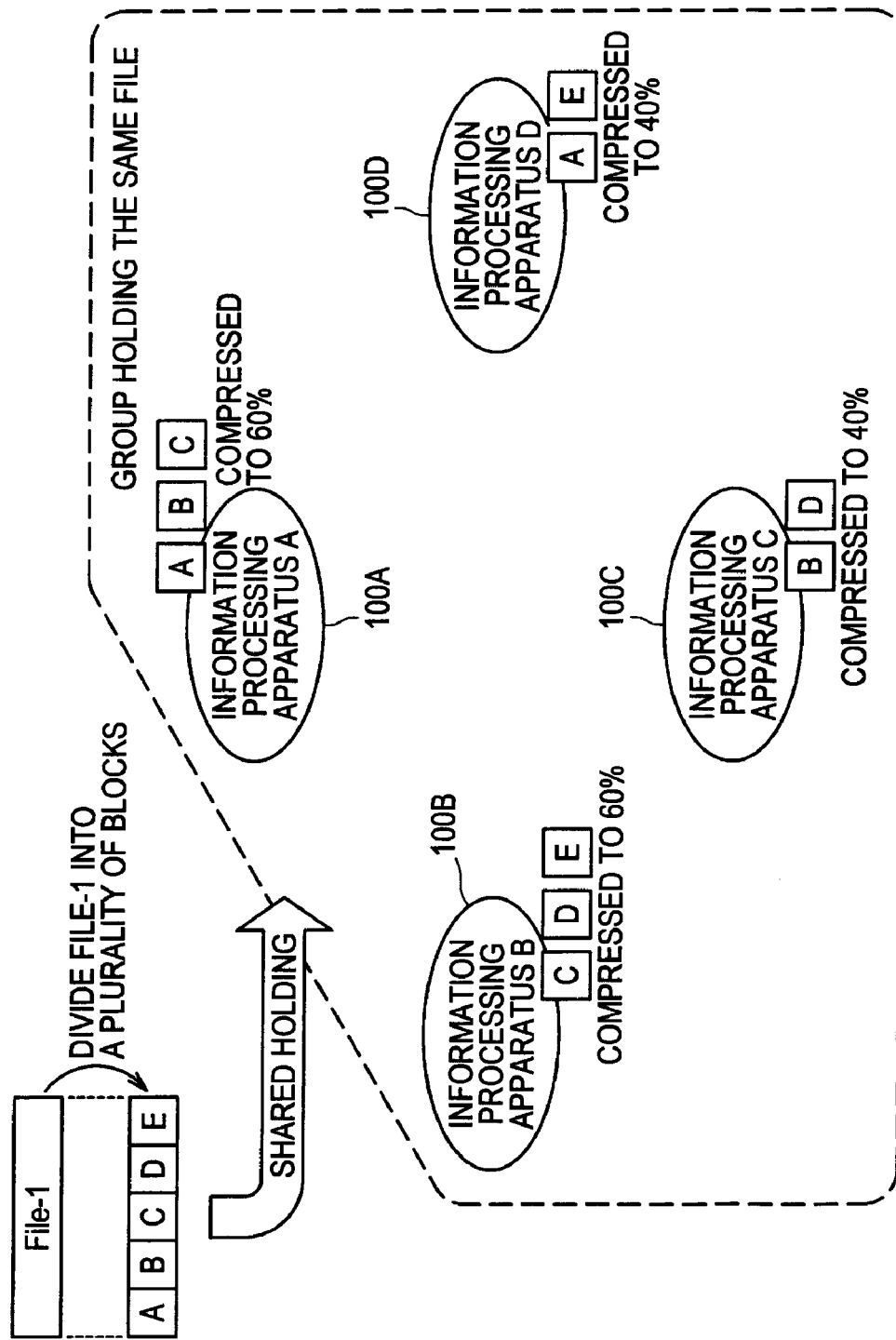
FIG. 2 is an explanatory view illustrating the overview of the information processing system according to the embodiment.

In the example shown in FIG. 2, for example, a data file (hereinafter, referred to simply as the file) is divided into five blocks A to E and one file is held by sharing the file among apparatuses holding the same file. That is, an information processing apparatus A shown in FIG. 2 holds, among the five blocks, only the blocks A, B, and C and an information processing apparatus B holds only the blocks C, D and E. Similarly, an information processing apparatus C shown in FIG. 2 holds only the blocks B and D and an information processing apparatus D holds only the blocks A and E. Accordingly, the size of the held file becomes 60% of that before the sharing in the information processing apparatuses A and B and the size of the held file becomes 40% of that before the sharing in the information processing apparatuses C and D. As a result, the similar effect as file compression can be achieved by share-holding a file.

Figure 3:
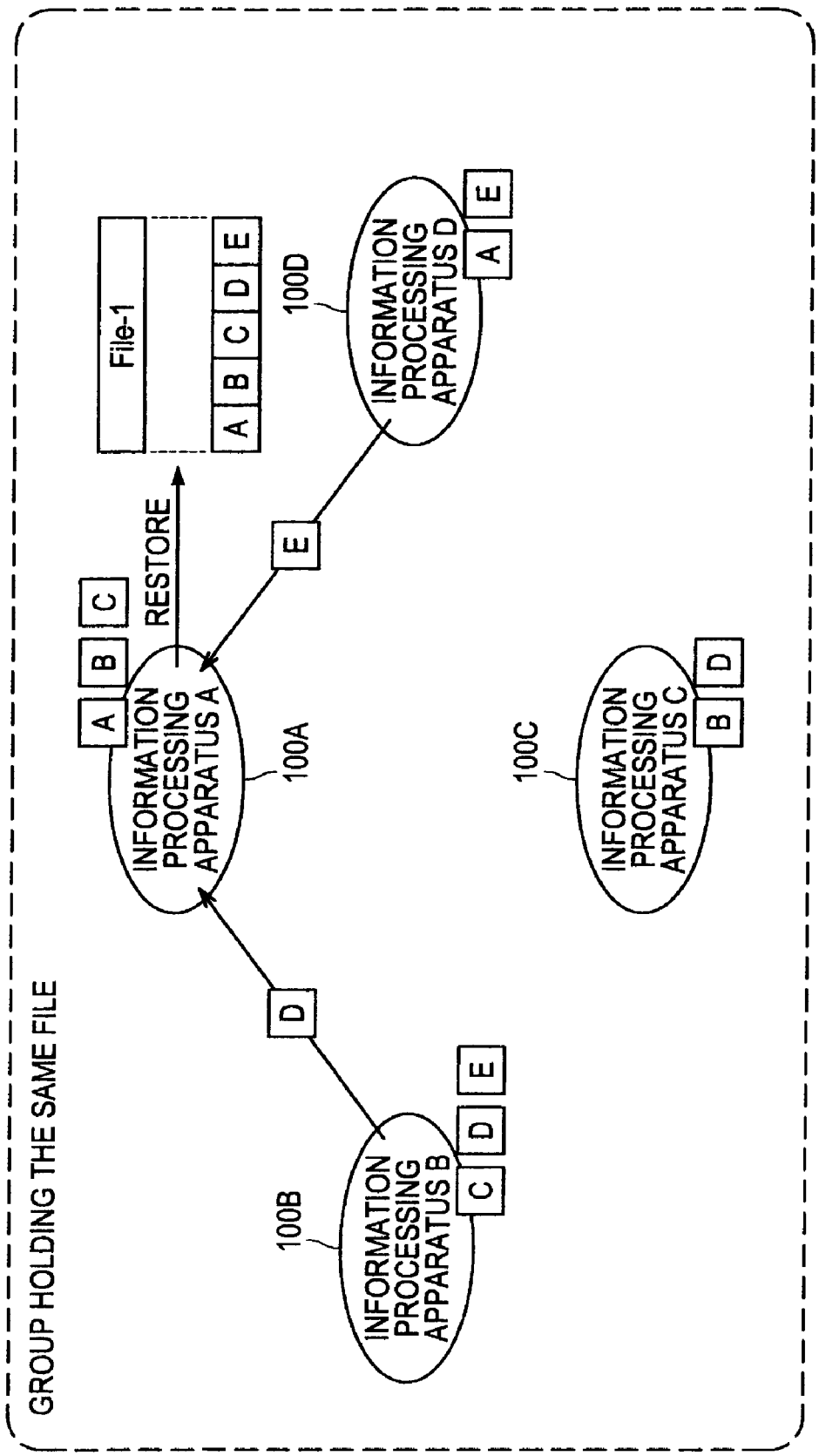
FIG. 3 is an explanatory view illustrating the overview of the information processing system according to the embodiment.

When a file only a portion of which is held should be used, the original file may be restored by acquiring blocks not held by the local apparatus (hereinafter, referred to as non-holding blocks) from information processing apparatuses holding such blocks. Consider, for example, a case in which the information processing apparatus A holding the blocks A, B, and C in the example shown in FIG. 3 executes File-1. In this case, the information processing apparatus A may acquire data files corresponding to the blocks D and E not held by the information processing apparatus A from information processing apparatuses holding such blocks. In FIG. 3, for example, the information processing apparatus A can acquire the block D from the information processing apparatus B and the block E from the information processing apparatus D. Accordingly, the information processing apparatus A now holds all the blocks A to E so that the original data file (File-1) can be restored.

Next, an overview of a case in which an information processing apparatus E holding the same file newly joins a group share-holding the same file will be described with reference to FIGS. 4 to 6.

Figure 4:
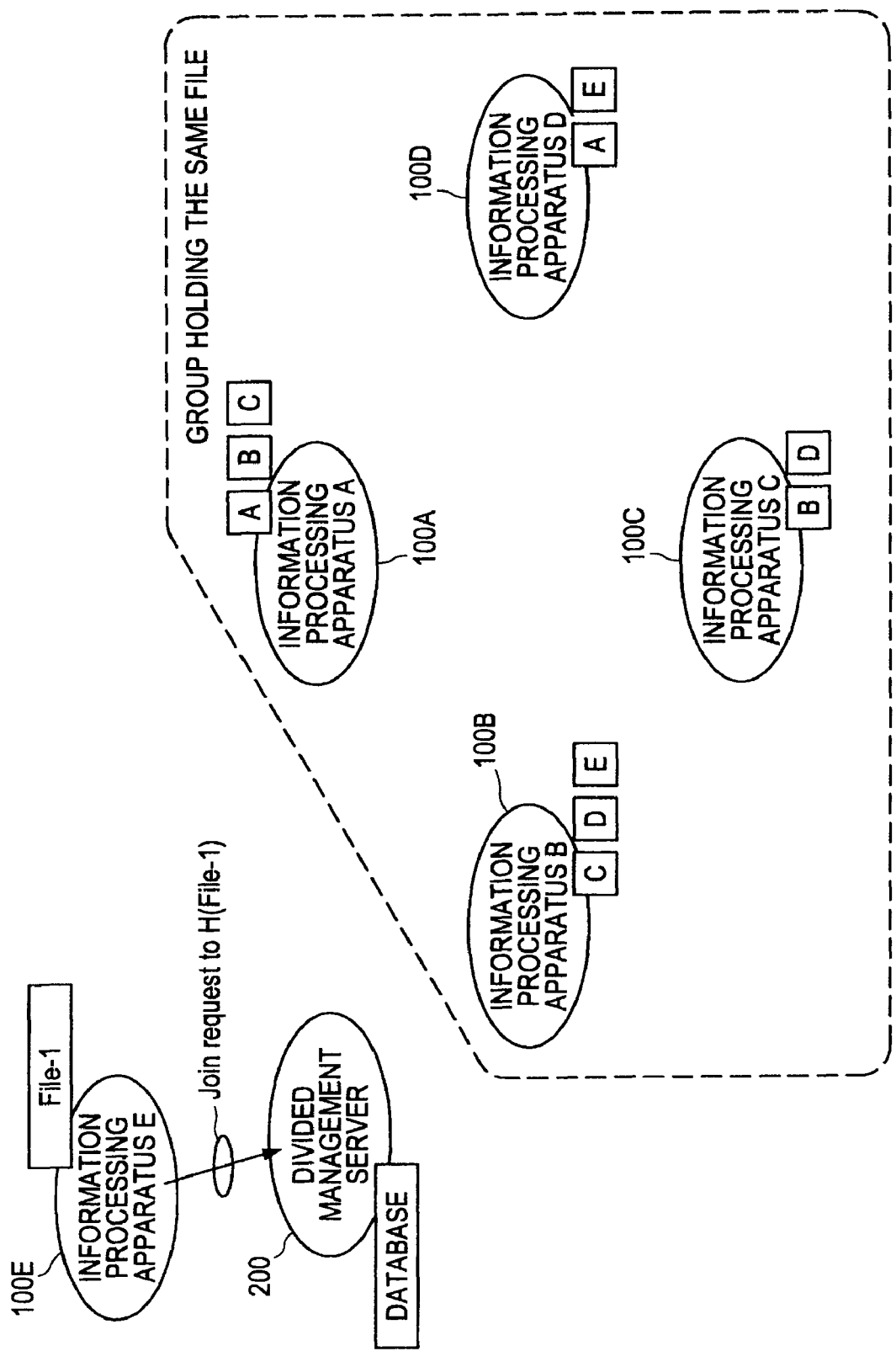
FIG. 4 is an explanatory view illustrating the overview of the information processing system according to the embodiment.

First, as shown, for example, in FIG. 4, the information processing apparatus E desiring divided management of a file makes a join request to a divided management server 200 that manages division conditions of the file for divided management. When a join request for divided management is made, data file identification information generated from file content is attached as information to identify the data file desired to join in. The data file identification information can be generated by, for example, using various kinds of hash functions such as the SHA-1 hash function. Here, the notation of H(x) in FIG. 4 means a hash value obtained as a result of processing content "x" using a hash function.

Next, the divided management server 200 that received the join request determines whether there is any group of information processing apparatuses sharing a file of the same content as that of the file requested to join in by using the data file identification information. The determination of presence/absence of such a group is made by referring to a database held by the divided management server 200 in which division conditions of files are written. If a group of the information processing apparatus that divides and holds corresponding files is present, the divided management server 200 reallocates blocks. More specifically, the information processing apparatus E that made the join request is caused to share some blocks held by information processing apparatuses belonging to the detected group.

Figure 5:
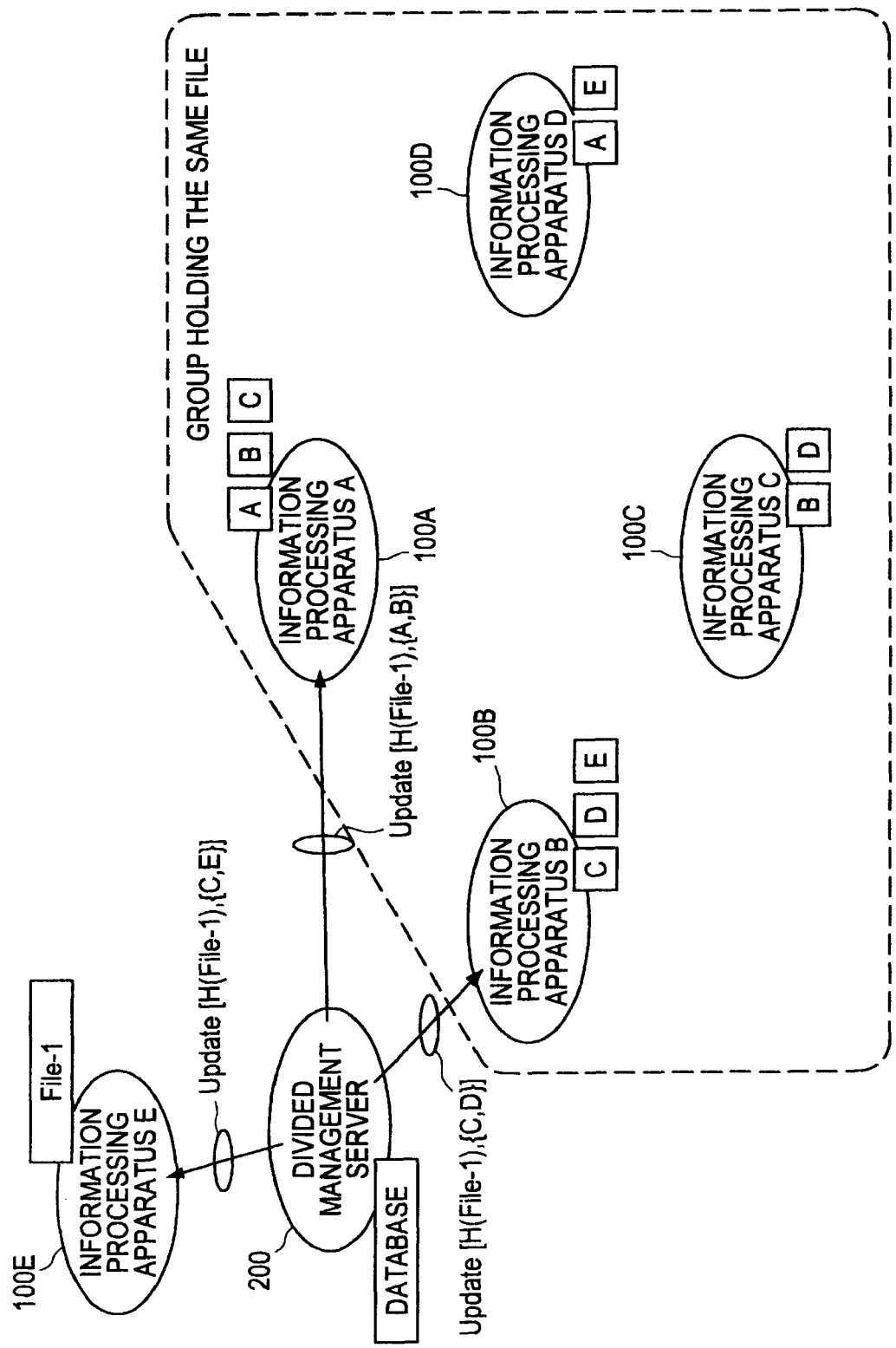
FIG. 5 is an explanatory view illustrating the overview of the information processing system according to the embodiment.

In the example in FIG. 5, for example, the divided management server 200 detects a group consisting of the information processing apparatuses A to D that divides and holds the same file by referring to the database. The divided management server 200 reallocates blocks in File-1 and decides to cause the information processing apparatus E that newly desires to join the group to hold, for example, the blocks C and E. The divided management server 200 updates content of the database and also transmits information about blocks to be held to the information processing apparatuses A and B whose share decreased and the information processing apparatus E to which a new share is allocated. Information about blocks to be held contains, as shown, for example, in FIG. 5, data file identification information to identify the data file and information to identify blocks to be held.

The information processing apparatuses A and B that have received information about blocks to be held delete the decreased share from the storage device (for example, a hard disk) of the local apparatus. The information processing apparatus E deletes blocks other than ones specified after the held file (File-1) being divided from the storage device of the local apparatus. Each information processing apparatus holds data file identification information stored therein instead of deleting the information. With the data file identification information held without being deleted, the information processing apparatus can grasp to which data file before being divided into blocks a data file held as a portion of blocks corresponds.

Figure 6:
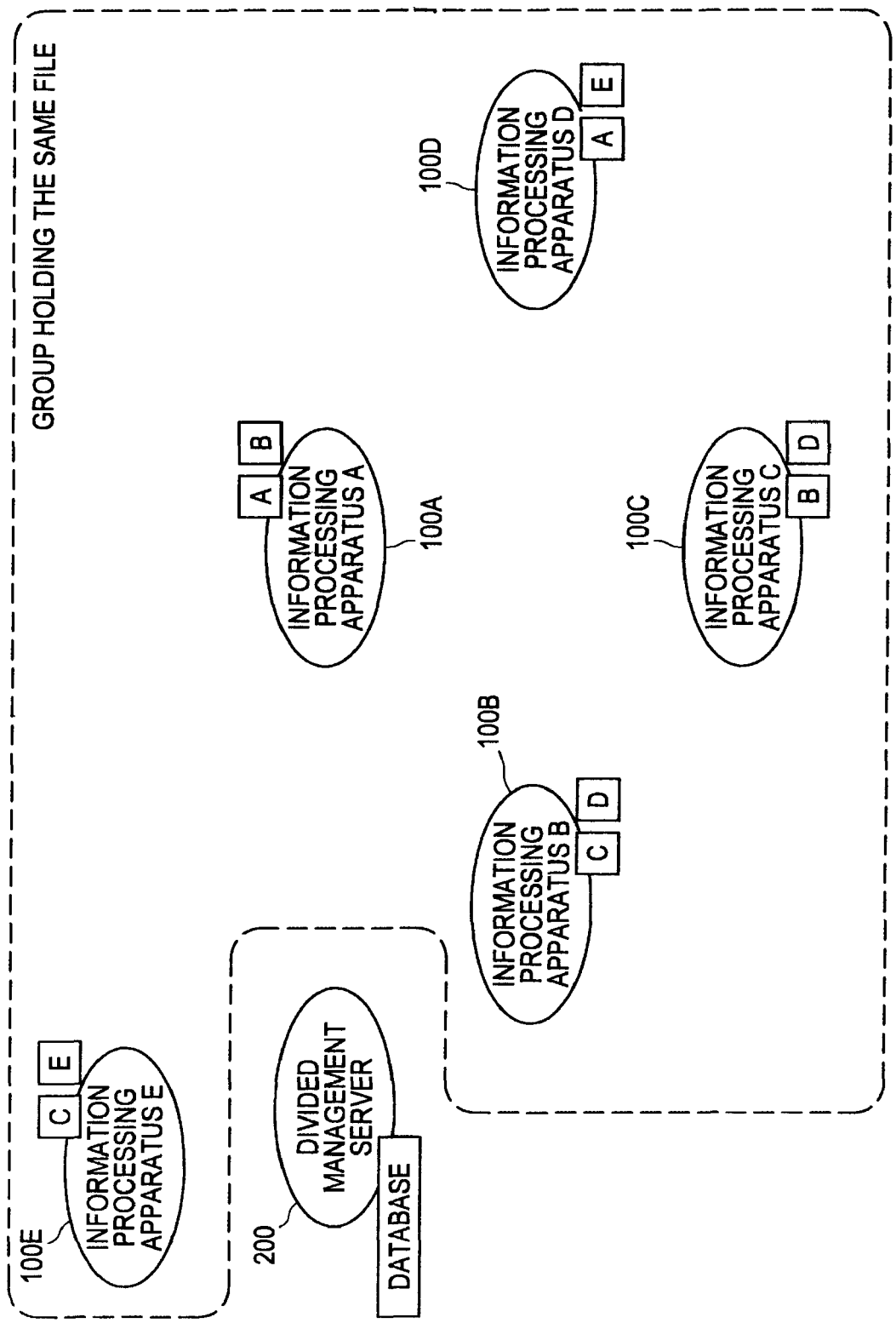
FIG. 6 is an explanatory view illustrating the overview of the information processing system according to the embodiment.
Figure 7:
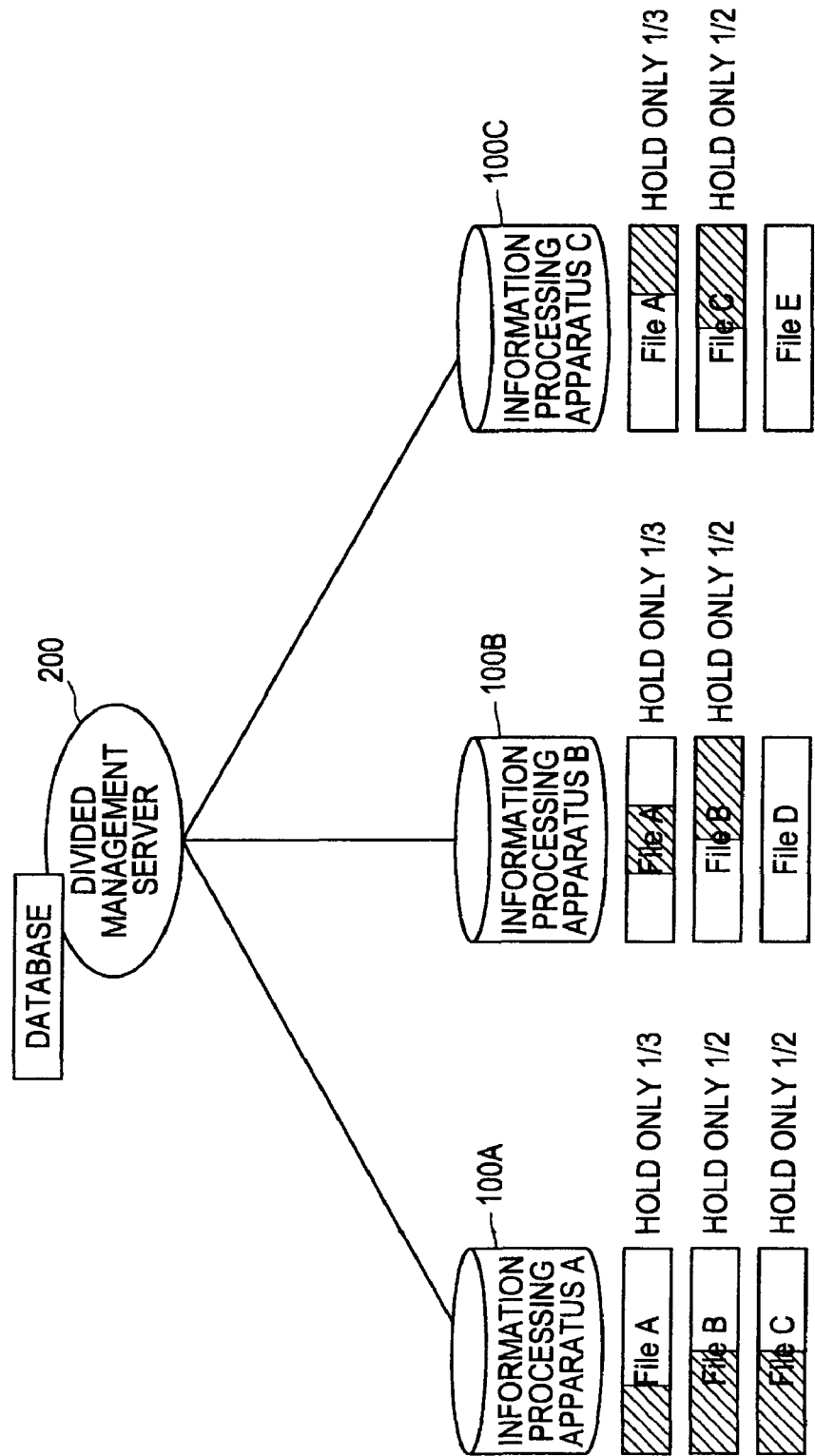
FIG. 7 is an explanatory view illustrating the overview of the information processing system according to the embodiment.

With such processing being performed, as shown, for example, in FIG. 6, the information processing apparatus E can join divided management of the data file and the data size of the held file (File-1) can be reduced.

Shared holding technology of a data file among a plurality of apparatuses whose overview is described above is called Peer-to-Peer (P2P) compression.

Such P2P compression can be performed on individual data files held by an information processing apparatus. Consider a case in which, as shown, for example, in FIG. 7, three information processing apparatuses that can be connected to the divided management server 200 are present. In this case, it is assumed that the information processing apparatus A holds three files of File A, File B, and File C and the information processing apparatus B holds File A, File B, and File D. It is also assumed that the information processing apparatus C holds File A, File C, and File E. If redundancy is not taken into consideration, three information processing apparatuses hold File A in the case shown in FIG. 7 and thus, each of the information processing apparatuses 100 will hold ⅓ of data. Similarly, File B and File C are each held by two information processing apparatuses and each of the information processing apparatuses 100 holding these files will hold ½ of data.

The information processing apparatuses A to C can automatically perform the above P2P compression on all files held by the local apparatus without user's instructions. Accordingly, when the information processing apparatus is, for example, a storage device, P2P compression is performed on all files held by the local apparatus so that an automatic P2P compression function storage device capable of increasing free storage space can be realized.

Next, an overview of processing to restore a data file only partial blocks of which are held will be described with reference to FIG. 8.

Figure 8:
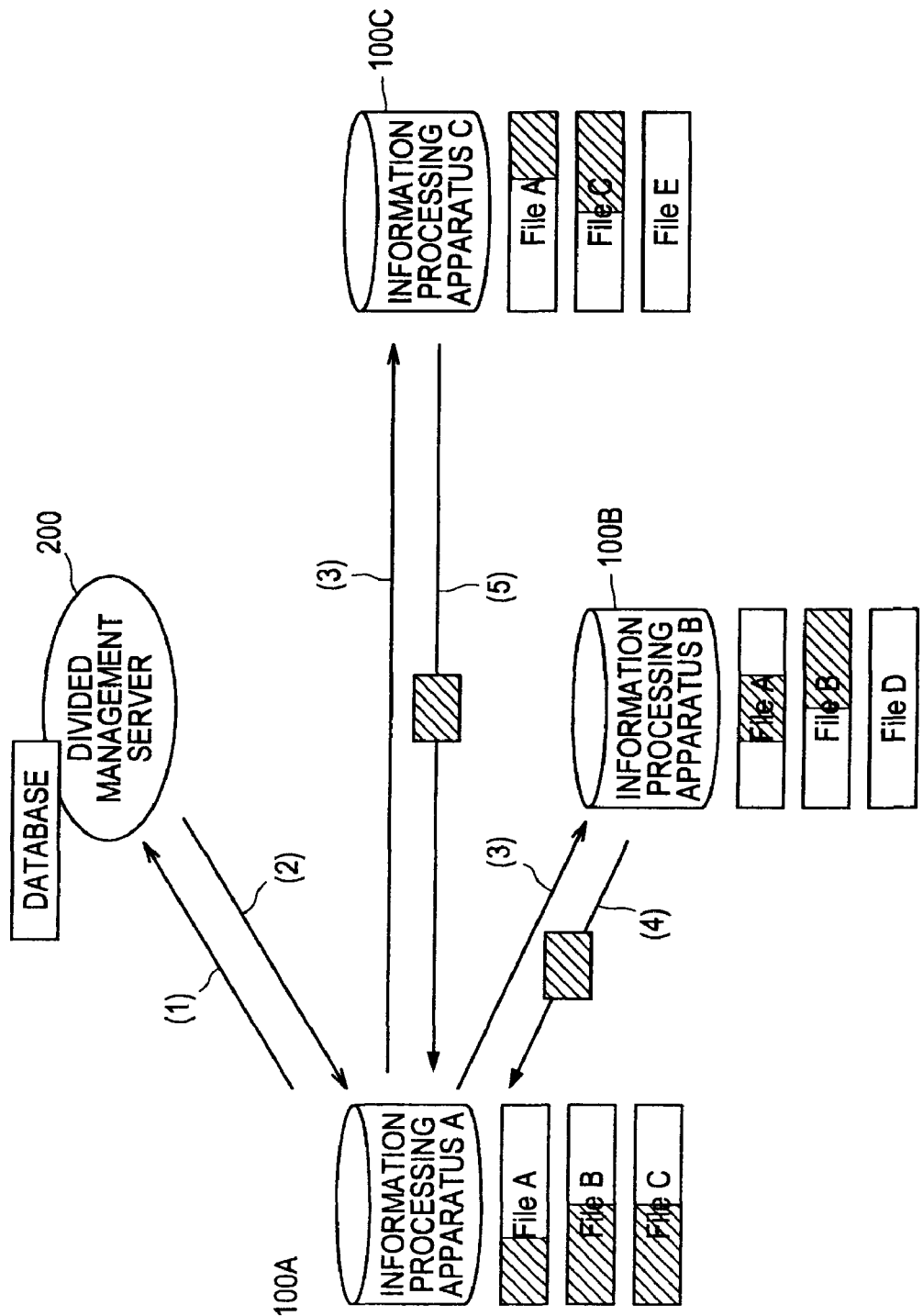
FIG. 8 is an explanatory view illustrating the overview of the information processing system according to the embodiment.

It is assumed, as shown, for example, in FIG. 8, that the information processing apparatus A holds three files of File A, File B, and File C and the information processing apparatus B holds File A, File B, and File D. It is also assumed that the information processing apparatus C holds File A, File C, and File E. Here, a case in which the information processing apparatus A restores File A will be described below.

First, the information processing apparatus A grasps division conditions of File A and transmits an acquisition request of file data division condition information to the divided management server 200 to know which information processing apparatuses hold non-holding blocks of the information processing apparatus A (1). At this point, the information processing apparatus A transmits data file identification information (for example, a hash value generated by using content of File A) of File A to the divided management server 200 to specify that division conditions concern File A.

Based on the transmitted data file identification information, the divided management server 200 refers to the database held by the local apparatus to detect information processing apparatuses holding non-holding blocks. Next, the divided management server 200 transmits information about the detected information processing apparatuses as data file division condition information about File A (2).

The information processing apparatus A that receives the data file division condition information knows that information processing apparatuses that hold non-holding blocks are the information processing apparatuses B and C by referring to the data file division condition information. As a result, the information processing apparatus A transmits an acquisition request of a block held by each apparatus to the information processing apparatuses B and C (3).

The information processing apparatuses B and C that receive the acquisition request of a block authenticate whether the information processing apparatus A is a valid owner of File A by a predetermined method. If authentication is successful, the information processing apparatus B transmits a block held by the information processing apparatuses B to the information processing apparatus A (4). Similarly, the information processing apparatus C transmits a block held by the information processing apparatuses C to the information processing apparatus A (5).

When all non-holding blocks are acquired, the information processing apparatus A restores File A using the acquired blocks and those held by the information processing apparatus A. Accordingly, the information processing apparatus A can acquire File A before being divided.

Processing to restore a P2P compressed data file to its original state as described above is called P2P decompression.

In the foregoing, an overview of an information processing system according to the present embodiment that enables the above P2P compression and P2P decompression has been described with reference to FIGS. 1 to 8. An information processing system according to the present embodiment will be described in detail below with reference to FIGS. 9 to 15.

<About Information Processing System>

Figure 9:
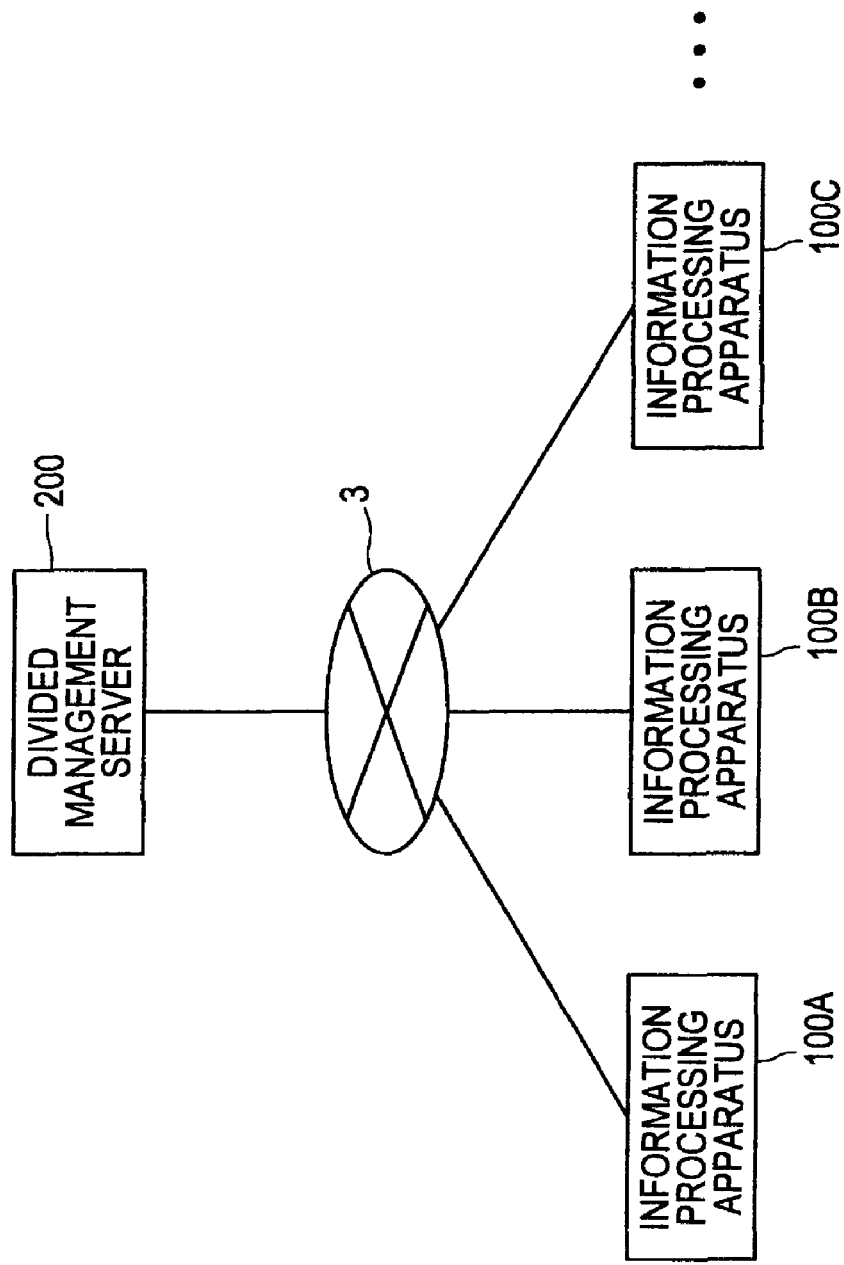
FIG. 9 is an explanatory view illustrating the information processing system according to the embodiment.

First, the configuration of an information processing system according to the present embodiment will be described with reference to FIG. 9. FIG. 9 is an explanatory view illustrating an information processing system 1 according to the present embodiment.

The information processing system 1 according to the present embodiment includes, as shown, for example, in FIG. 9, the plurality of information processing apparatuses 100A, 100B, 100C, . . . and the divided management server 200. The information processing apparatuses 100A, 100B, 100C, . . . and the divided management server 200 are mutually connected by a communication network 3.

The communication network 3 is a communication line network that uni-directionally communicably or bi-directionally communicably connects information processing apparatus 100 and the divided management server 200. The communication network 3 may be configured of a public line network or a leased line network. Moreover, it does not matter whether the communication network 3 is implemented by wire or by radio. Examples of the public line network include, for example, the Internet, an NGN (Next Generation Network) network, telephone line network, satellite communication network, and broadcast communication line. Examples of the leased line network include, for example, a WAN, LAN, IP-VPN, Ethernet (registered trademark), and wireless LAN.

The information processing apparatuses 100A, 100B, 100C (hereinafter, also called simply as the information processing apparatus 100) are apparatuses provided with a storage device that can hold various kinds of data files. The information processing apparatus 100 can perform the above P2P compression processing and P2P decompression processing on data files held by the local apparatus with the other information processing apparatus 100 having the same data file.

The function of the information processing apparatus 100 is realized by, for example, a mobile information terminal, mobile phone, mobile game machine, mobile music player, broadcasting device, personal computer, storage device, or home information appliance.

The information processing apparatus 100 will again be described below in detail.

The divided management server 200 holds a data file division condition database in which division conditions of data files among a plurality of the information processing apparatuses 100. When a join request to divided management of a data file transmitted from one of the information processing apparatuses 100 is transmitted, the divided management server 200 also decides division condition changes of the data file if necessary and notifies the relevant information processing apparatuses of the division conditions. The divided management server 200 will again be described below in detail.

<Configuration of Information Processing Apparatus>

Figure 10:
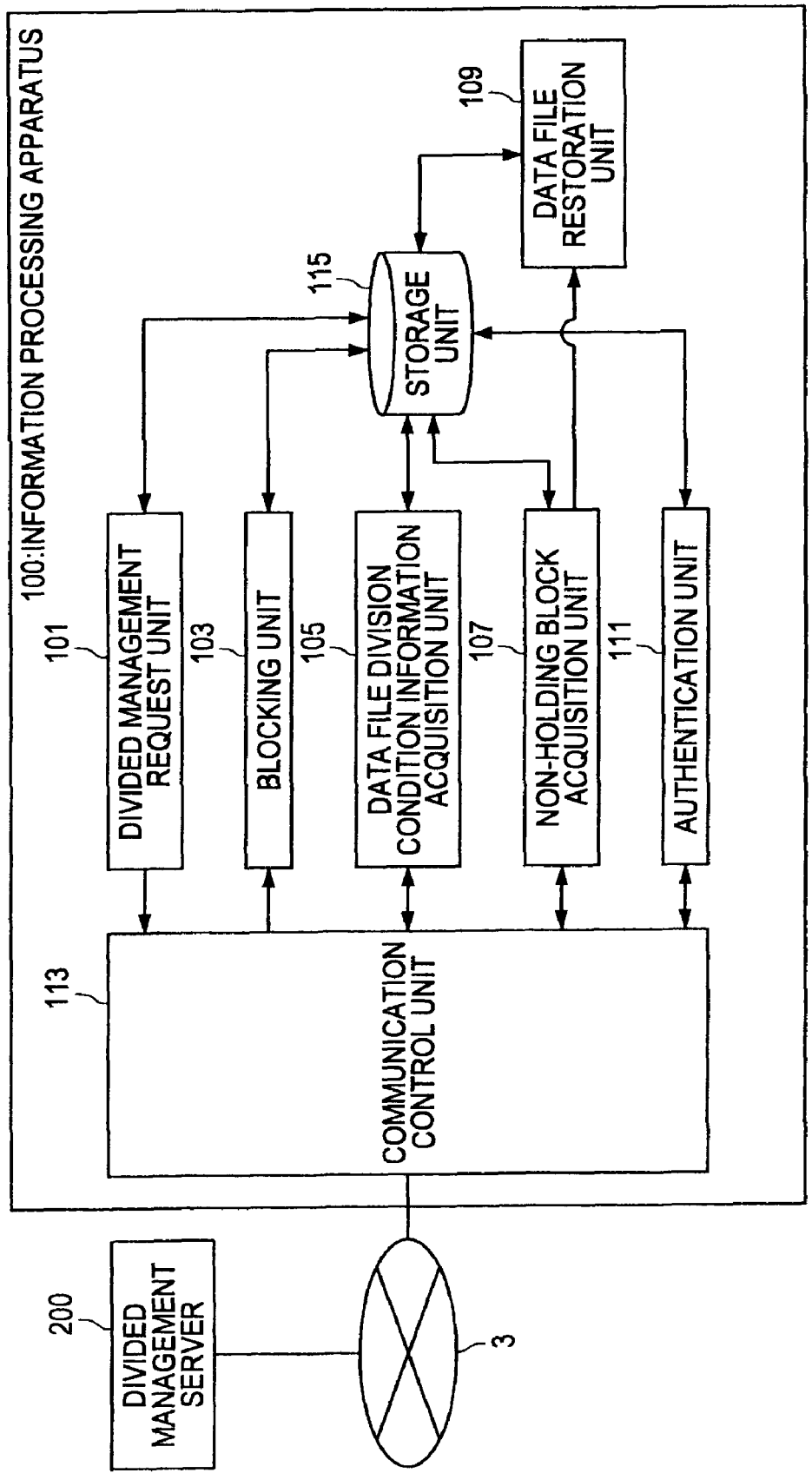
FIG. 10 is a block diagram illustrating a configuration of an information processing apparatus according to the embodiment.

Next, the configuration of an information processing apparatus according to the present embodiment will be described in detail with reference to FIG. 10. FIG. 10 is a block diagram illustrating the configuration of an information processing apparatus according to the present embodiment.

As shown, for example, in FIG. 10, the information processing apparatus 100 according to the present embodiment includes a divided management request unit 101, a blocking unit 103, a data file division condition information acquisition unit 105, a non-holding block acquisition unit 107, a data file restoration unit 109, and an authentication unit 111. Further, the information processing apparatus 100 according to the present embodiment includes a communication control unit 113 and a storage unit 115.

The divided management request unit 101 is configured of, for example, a CPU (Central Processing Unit), ROM (Read Only Memory), RAM (Random Access Memory) and the like. When the information processing apparatus 100 executes file divided management of a data file held by the information processing apparatus 100, the divided management request unit 101 transmits a join request to divided management of the data file to the divided management server 200. Data file identification information, which is information to identify each data file, is attached to information representing the join request to divided management. With the data file identification information being attached to the join request to divided management, the divided management server 200 can grasp divided management of which data file the information processing apparatus 100 desires. The data file identification information is, for example, a hash value generated by using content of the data file for which divided management is desired. The hash function used to generate a hash value is not specifically limited and, for example, a hash function of any number of bits such as SHA-1 may be used. The divided management request unit 101 records the generated hash value in the storage unit 115 described later or the like.

The blocking unit 103 is configured of, for example, a CPU, ROM, RAM and the like. The blocking unit 103 acquires holding block information, which is information about blocks to be held by the local apparatus, from the divided management server 200 or the like. The blocking unit 103 also divides a data file held by the local apparatus based on the acquired holding block information to generate a plurality of blocks. The blocking unit 103 records, among the plurality of generated blocks, blocks identified by the holding block information in the storage unit 115 described later or the like as data file identification information. The holding block information is information about blocks to be held by the local apparatus. The holding block information has information of content such as "Record data between the x-th position and the y-th position counted from the head of data file as a block i" written therein.

The total data size of blocks held by the information processing apparatus 100 is decided based on holding block information transmitted by, for example, the divided management server 200. The total data size of held blocks can be set to any value and may be the size calculated by, for example, Formula 101 below.

$$D_{CX} = \left(\beta - \frac{\beta-1}{N_C}\right) \times \frac{D_C}{N_C} \qquad \text{(Formula 101)}$$

where $D_{CX}$ in Formula 101 above is the data size of blocks held by the local apparatus, $N_C$ is the number of information processing apparatuses including the local apparatus holding a data file C, $\beta$ is a redundancy coefficient ($\beta>1$), and $D_C$ is the data size of the data file C.

Among the above parameters, the redundancy coefficient $\beta$ is a coefficient that indicates how many information processing apparatuses hold one block and the redundancy coefficient $\beta$ equal to N indicates that one block is held by N information processing apparatuses. By making the redundancy coefficient greater than 1, one block is held by a plurality of information processing apparatuses. Thus, even if data of a block is lost in some information processing apparatus, the loss of data of the block from the whole system can be prevented.

The total data size of held blocks may be the size calculated by, for example, Formula 102 below.

$$D_{CX} = \{(N_C - \beta_N) \cdot \alpha_X + \beta_N\} \times \frac{D_C}{N_C} \qquad \text{(Formula 102)}$$

$$\beta_N = \beta - \frac{\beta-1}{N_C} \qquad \text{(Formula 103)}$$

where $D_{CX}$ in Formula 102 above is the data size of blocks held by the local apparatus, $N_C$ is the number of information processing apparatuses including the local apparatus holding the data file C, $\alpha_X$ is a utilization frequency ($0 \leq \alpha_X \leq 1$) of the data file C by the local apparatus, $\beta_N$ is the redundancy coefficient calculated by Formula 103 using the redundancy coefficient ($\beta>1$), and $D_C$ is the data size of the data file C.

As is evident from Formula 103, the redundancy coefficient $\beta_N$ in Formula 102 dynamically changes depending on the number of information processing apparatuses holding the data file C. The total data size of blocks held by an information processing apparatus also changes depending on the utilization frequency of the relevant data file. Thus, when a sufficiently large number of information processing apparatuses are present and $N_C$ is large and also the utilization frequency is low (that is, $\alpha_X=0$), $D_{CX}=\beta \times (D_C/N_C)$ is obtained. That is, the total data size is obtained by dividing the original data size by the number of information processing apparatuses, then multiplied by the redundancy. When a sufficiently large number of information processing apparatuses are present and utilized frequently (that is, $\alpha_X=1$), $D_{CX}=D_C$ is obtained. This indicates that the total data size is equal to the original data size, that is, this corresponds to a case in which P2P compression is not performed.

By changing the total data size depending on the utilization frequency, as described above, the file access time for P2P decompression can be adjusted so that a decrease in usability can be prevented.

The data file division condition information acquisition unit 105 is configured of, for example, a CPU, ROM, RAM and the like. The data file division condition information acquisition unit 105 acquires data file division condition information indicating division conditions of data files held by the local apparatus with other information processing apparatuses holding the data files from the divided management server 200. More specifically, the data file division condition information acquisition unit 105 transmits data file identification information of a data file whose division conditions is desired to be known to the divided management server 200. The data file division condition information is, for example, information necessary to perform P2P decompression processing and is acquired from the divided management server 200 by the data file division condition information acquisition unit 105 when, for example, an operation to perform P2P decompression processing is input into the information processing apparatus 100.

The divided management server 200 holds a data file division condition database in which division conditions of a data file as shown, for example, in FIG. 11 are written. As shown in FIG. 11, the database associates and records data file identification information, the information processing apparatus holding a data file, and information about blocks held by the information processing apparatus. The divided management server 200 searches the database based on the transmitted data file identification information to obtain the identification number (node ID) of the information processing apparatus holding the data file or information about blocks held by each information processing apparatus. Subsequently, the divided management server 200 transmits information obtained as a result of the search to the information processing apparatus 100 as data file division condition information.

The data file division condition information acquisition unit 105 transmits data file division condition information transmitted from the divided management server 200 to the non-holding block acquisition unit 107 described below. The data file division condition information acquisition unit 105 may also store the acquired data file division condition information in the storage unit 115 described below.

The non-holding block acquisition unit 107 is configured of, for example, a CPU, ROM, RAM and the like. The non-holding block acquisition unit 107 determines the other information processing apparatuses 100 holding non-holding blocks based on the data file division condition information transmitted from the data file division condition information acquisition unit 105 hold blocks recorded in the storage unit 115. Further, the non-holding block acquisition unit 107 transmits an acquisition request of non-holding blocks to the other information processing apparatuses 100 holding non-holding blocks to acquire a data file corresponding to non-holding blocks from the other information processing apparatuses 100 holding non-holding blocks.

In the information processing system 1 according to the present embodiment, the other information processing apparatuses 100 holding non-holding blocks performs authentication processing of the information processing apparatus 100 that transmitted the acquisition request before relevant blocks being transmitted. Thus, the non-holding block acquisition unit 107 generates various kinds of data requested from the other information processing apparatuses 100 using data transmitted from the other information processing apparatuses 100 and various kinds of data recorded in the local apparatus and transmits the data to the other relevant information processing apparatuses 100.

The non-holding block acquisition unit 107 transmits a data file corresponding to the acquired non-holding blocks to the data file restoration unit 109 described below.

The data file restoration unit 109 is configured of, for example, a CPU, ROM, RAM and the like. The data file restoration unit 109 performs restoration processing of a data file based on data files corresponding to non-holding blocks transmitted from the non-holding block acquisition unit 107 and those corresponding to hold blocks recorded in the storage unit 115 or the like.

The authentication unit 111 is configured of, for example, a CPU, ROM, RAM and the like. When an acquisition request of a block held by the local apparatus is transmitted from the other information processing apparatus 100, the authentication unit 111 authenticates the other information processing apparatus 100 based on whether the other information processing apparatus 100 holds a data file in a suitable format.

If no authentication processing is performed when an acquisition request of a block held by the local apparatus is transmitted from the other information processing apparatus 100, even an apparatus that does not hold its share of blocks can acquire all blocks from a plurality of information processing apparatuses. Thus, by performing authentication processing described below, unauthorized action can be prevented.

Authentication processing performed by the authentication unit 111 can include, for example, digest authentication using holding block information. The authentication unit 111 can perform two kinds of digest authentication processing shown below in accordance with holding conditions of blocks of the other information processing apparatuses 100.

First, the authentication unit 111 makes an inquiry at the divided management server 200 about blocks that should be held by the other information processing apparatuses 100 using identification information to identify the other information processing apparatuses 100 and data file identification information attached to the acquisition request of blocks. The divided management server 200 can identify blocks held by the other information processing apparatuses 100 by referring to the data file division condition database held by the server. By referring to a reply from the divided management server 200, the authentication unit 111 can know information about blocks that should be held by the information processing apparatus 100 that made the acquisition request.

If the information processing apparatus 100 that made the acquisition request is considered to hold the same block as that held by the local apparatus, the authentication unit 111 performs digest authentication processing described below.

The authentication unit 111 first decides a parameter R randomly. Next, the authentication unit 111 transmits information to identify at least a portion of the data file corresponding to a block that should be held by the information processing apparatus 100 that made the acquisition request and the parameter R to the information processing apparatus 100 that made the acquisition request. Here, information to identify at least a portion of a data file corresponding to a block that should be held includes, for example, an address range in a block (hereinafter, sometimes referred to as a byte range), which is information specifying a portion of the block that should be held. When the information and the parameter R are transmitted, the authentication unit 111 makes a request to generate a hash value using these values.

The non-holding block acquisition unit 107 of the information processing apparatus 100 that received the above information cuts out data content of the specified byte range of the specified block to calculate a hash value of data that links the cut-out content and the transmitted value R. The non-holding block acquisition unit 107 of the information processing apparatus 100 that completed calculation of a hash value sends back the calculated hash value.

On the other hand, the authentication unit 111 cuts out data content of the specified byte range of the block of which the information processing apparatus 100 that made the request is notified to calculate a hash value of data that links the cut-out content and the decided value R in advance. The authentication unit 111 that receives the hash value compares the hash value calculated in advance and the hash value transmitted from the information processing apparatus 100 that made the request.

If, as a result of comparison, both hash values match, the authentication unit 111 determines that the information processing apparatus 100 that made the request is a valid node (that is, an information processing apparatus that holds a data file and thus, blocks in a suitable format) and determines that the authentication is successful. Conversely, if both hash values do not match, the authentication unit 111 considers that the information processing apparatus 100 that made the request is an invalid node and determines that the authentication failed.

If the information processing apparatus 100 that made the acquisition request does not hold the same block as that held by the local apparatus, the authentication unit 111 performs digest authentication processing described below.

First, the authentication unit 111 makes an inquiry at the divided management server 200 about whether the third information processing apparatus 100 that similarly holds the block that should be held by the information processing apparatus 100 that made the acquisition request is present. The divided management server 200 performs a search whether the third information processing apparatus 100 is present by referring to the data file division condition database and transmits a search result to the authentication unit 111.

If the third information processing apparatus 100 described above is not present, the authentication unit 111 determines that the authentication failed.

If the third information processing apparatus 100 is present and a common block that is a block held by the information processing apparatus that made the acquisition request and the third information processing apparatus 100 in common is present, the authentication unit 111 first decides the parameter R used for digest authentication randomly. Next, the authentication unit 111 transmits information to identify at least a portion of the data file corresponding to the common block and the parameter R to both the information processing apparatus that made the acquisition request and the third information processing apparatus.

The non-holding block acquisition unit 107 of each of the information processing apparatuses 100 that received the above information cuts out data content of the specified byte range of the specified block to calculate a hash value of data that links the cut-out content and the transmitted value R. The non-holding block acquisition unit 107 of each of the information processing apparatuses 100 that completed calculation of a hash value sends back the calculated hash value.

The authentication unit 111 that received hash values from both the information processing apparatus that made the acquisition request and the third information processing apparatus compares the two received hash values. If the two received hash values have the same value, the authentication unit 111 determines that the information processing apparatus 100 that made the acquisition request is a valid node and determines that the authentication is successful. If the two received hash values have different values, at least one of the information processing apparatus that made the acquisition request and the third information processing apparatus can be considered an invalid node. Thus, the authentication unit 111 makes an inquiry at the divided management server 200 about whether a fourth information processing apparatus that holds another block held by the information processing apparatus that made the acquisition request is present and repeats the similar processing. If both hash values do not match again, the authentication unit 111 determines that the information processing apparatus 100 that made the acquisition request is an invalid node and determines that the authentication failed. If both hash values match, the authentication unit 111 determines that the information processing apparatus that made the acquisition request is a valid node and determines the authentication is successful. While the authentication unit 111 determines whether hash values match by using two different information processing apparatuses (the third and fourth information processing apparatuses), the present embodiment is not limited to the above example.

Thus, in the information processing apparatus 100 according to the present embodiment, when acquisition processing to acquire non-holding blocks not held by the local apparatus is performed, authentication processing is performed by the information processing apparatus 100 holding non-holding blocks. Since the information processing apparatus 100 is denied acquisition of non-holding blocks if a data file is not held in a suitable format, a file sharing system that allows anyone to access all files will not be constructed. Therefore, even if a data file is protected by rights such as copyrights, processing that is not supposed by authors will not be performed. Moreover, an effect similar to a license of a data file can be obtained by the authentication processing.

The communication control unit 113 is configured of, for example, a CPU, ROM, RAM and the like. The communication control unit 113 exercises communication control of various kinds of data transmitted/received between the information processing apparatus 100 and the divided management server 200 and between a plurality of the information processing apparatuses 100. More specifically, the communication control unit 113 receives requests from each processing unit contained in the information processing apparatus 100 according to the present embodiment and transmits various kinds of data and signals to the divided management server 200 or the other information processing apparatuses 100. The communication control unit 113 also receives various kinds of data and signals transmitted from the divided management server 200 or the other information processing apparatuses 100 and transmits the data or signals to each processing unit contained in the information processing apparatus 100 according to the present embodiment.

The communication control unit 113 can use the storage unit 115 described below as a buffer for transmission/reception.

The storage unit 115 has blocks of a data file to be held by the information processing apparatus 100 according to the present embodiment recorded by associating with data file identification information, which is information to identify the data file. Accordingly, regarding a data file divided for management with the other information processing apparatuses 100, only a data file corresponding to blocks that should be held by the local apparatus is recorded in the storage unit 115. A utilization history of a data file held by being divided into blocks may also be recorded in the storage unit 115.

Moreover, various parameters that need to be saved when the information processing apparatus 100 according to the present embodiment performs some process, progress of the process, or various databases may be recorded in the storage unit 115 when appropriate. The divided management request unit 101, the blocking unit 103, the data file division condition information acquisition unit 105, the non-holding block acquisition unit 107, the data file restoration unit 109, the authentication unit 111, and the communication control unit 113 can freely write to/read from the storage unit 115.

In the foregoing, examples of the function of the information processing apparatus 100 according to the present embodiment have been shown. Each of the above components may be constructed by using general-purpose members or circuits or by hardware specialized for the function of each component. Alternatively, the functions of components may all be performed by a CPU. Therefore, the configuration to be used can be changed as appropriate in accordance with the technical level when the present embodiment is carried out.

A computer program to realize each function of an information processing apparatus according to the present embodiment as described above can be created and loaded into a personal computer. Alternatively, a computer readable recording medium in which such a computer program is stored can be provided. The recording medium may be a magnetic disk, optical disk, magneto-optical disk, flash memory or the like. Instead of using a recording medium, the above computer program may be delivered via a network.

<Configuration of Divided Management Server>

Figure 12:
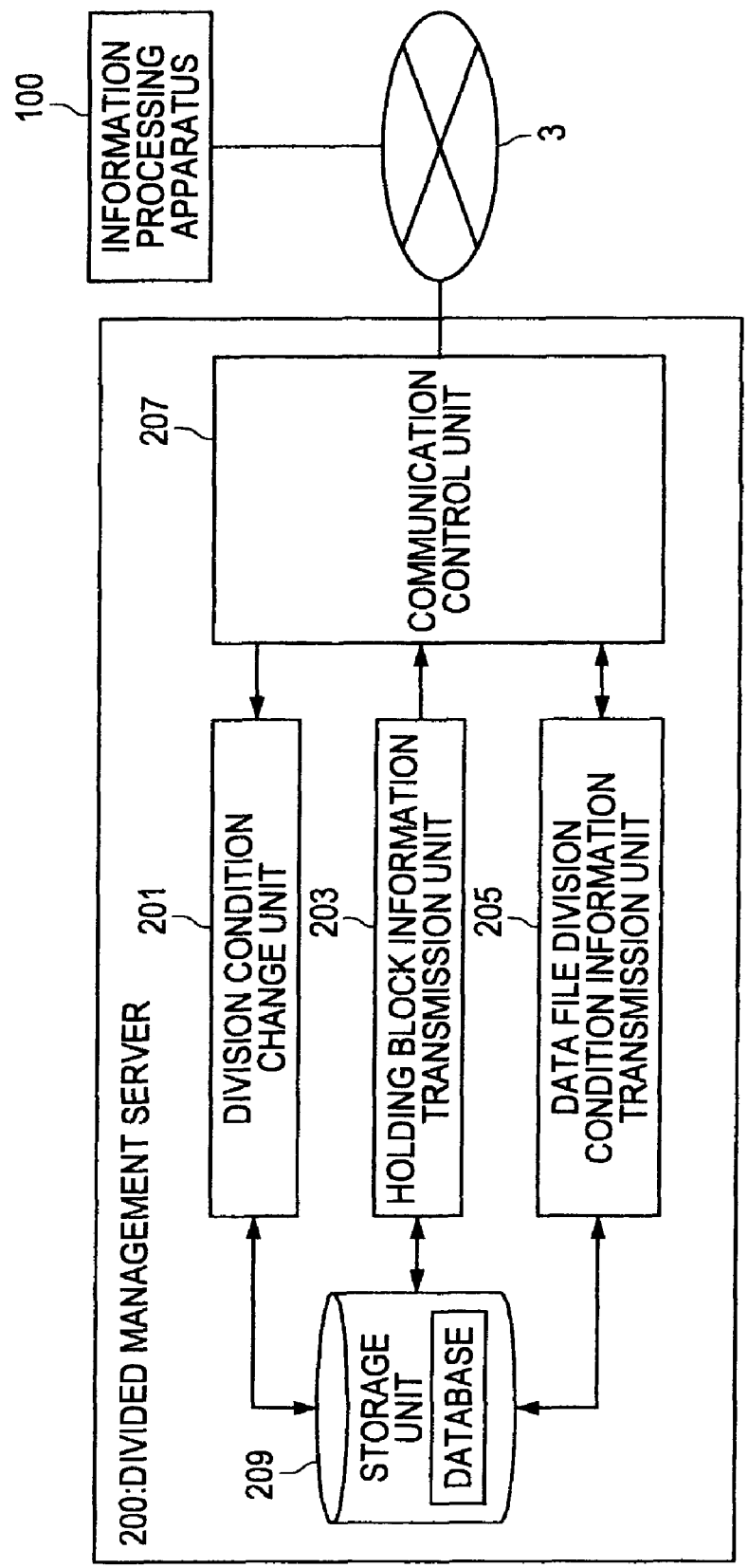
FIG. 12 is a block diagram illustrating the configuration of a divided management server according to the embodiment.

Subsequently, the configuration of the divided management server 200 according to the present embodiment will be described in detail with reference to FIG. 12. FIG. 12 is a block diagram illustrating the function of the divided management server 200 according to the present embodiment.

The divided management server 200 according to the present embodiment mainly includes, as shown, for example, in FIG. 12, a division condition change unit 201, a holding block information transmission unit 203, a data file division condition information transmission unit 205, a communication control unit 207, and a storage unit 209.

The division condition change unit 201 is configured of, for example, a CPU, ROM, RAM and the like. When a join request to divided management of a data file is transmitted from the information processing apparatus 100, the division condition change unit 201 changes division conditions of the data file to which a join request is made and which is managed by being divided into a plurality of blocks.

First, the division condition change unit 201 grasps division conditions of the data file to which a join request is made by referring to a data file division condition database stored in the storage unit 209 described below. The data file division condition database contains, as shown, for example, in FIG. 11, at least data file identification information, information to identify the information processing apparatus holding a data file, and information to identify blocks held by each of the information processing apparatuses. The division condition change unit 201 can grasp the information processing apparatus holding the data file and blocks held by each of the information processing apparatuses 100 by searching the database based on the data file identification information contained in the join request to divided management. Next, the division condition change unit 201 changes division conditions of the data file using a predetermined method. When the change of division conditions of the data file is completed, the division condition change unit 201 updates content of the data file division condition database. The division condition change unit 201 also notifies the holding block information transmission unit 203 described below of the changed division conditions.

Here, the division condition change unit 201 preferably changes blocks to be held by each of a plurality of information processing apparatuses in accordance with redundancy preset by the divided management server 200.

When division conditions of a data file are changed, the division condition change unit 201 can change the data size $D_{CX}$ of blocks held by each of the plurality of the information processing apparatuses 100 to the size calculated based on Formula 201 below.

$$D_{CX} = \left(\beta - \frac{\beta-1}{N_C}\right) \times \frac{D_C}{N_C} \quad \text{(Formula 201)}$$

where $D_{CX}$ in Formula 102 above is the data size of blocks held by each the information processing apparatuses 100, $N_C$ is the number of the information processing apparatuses 100 holding the data file C, $\beta$ is the redundancy coefficient ($\beta>1$), and $D_C$ is the data size of the data file C.

When, for example, a request is issued by the information processing apparatus 100, the division condition change unit 201 may change the data size $D_{CX}$ of blocks held by each of the plurality of the information processing apparatuses 100 based on, instead of Formula 201, Formula 202 below.

$$D_{CX} = \{(N_C - \beta_N) \cdot \alpha_X + \beta_N\} \times \frac{D_C}{N_C} \quad \text{(Formula 202)}$$

$$\beta_N = \beta - \frac{\beta-1}{N_C} \quad \text{(Formula 203)}$$

where $D_{CX}$ in Formula 202 above is the data size of blocks held by each the information processing apparatuses 100 and $N_C$ is the number of information processing apparatuses 100 holding the data file C. $\alpha_X$ is the utilization frequency ($0 \leq \alpha_X \leq 1$) of the data file C by the information processing apparatus 100, $\beta_N$ is the redundancy coefficient calculated by Formula 203 using the redundancy coefficient $\beta$ ($\beta>1$), and $D_C$ is the data size of the data file C.

When the data size of a data file is changed based on Formula 202 above, the utilization frequency of the information processing apparatus 100 becomes necessary and the utilization frequency can be obtained, for example, in the following manner: In an information processing system according to the present embodiment, as described above, when an information processing apparatus acquires non-holding blocks, the information processing apparatus 100 transmits an acquisition request of data file division condition information to the divided management server 200. Thus, the divided management server 200 can obtain the utilization frequency of a data file by each of the information processing apparatuses 100 by recording the date/time when an acquisition request of data file division condition information is transmitted, number of times and the like as a history.

The division condition change unit 201 also changes holding blocks to be held by each of the information processing apparatuses 100 in such a way that distribution conditions become fair among the information processing apparatuses 100.

The holding block information transmission unit 203 is configured of, for example, a CPU, ROM, RAM and the like. The holding block information transmission unit 203 transmits holding block information, which is information about blocks to be held, to the information processing apparatuses 100 affected by changed division conditions based on the changed division conditions of the data file transmitted from the division condition change unit 201.

The data file division condition information transmission unit 205 is configured of, for example, a CPU, ROM, RAM and the like. When an acquisition request of data file division condition information, which is information representing division conditions of a data file, is transmitted from the information processing apparatus 100, the data file division condition information transmission unit 205 transmits the relevant data file division condition information to the information processing apparatus 100 that made the request. More specifically, the data file division condition information transmission unit 205 refers to the data file division condition database based on the data file identification information written in the transmitted acquisition request of data file division condition information to search for division conditions of the relevant data file. The database has information as shown, for example, in FIG. 11 written therein and thus, the data file division condition information transmission unit 205 can grasp division conditions of the requested data file. The data file division condition information transmission unit 205 transmits division conditions obtained as a result of the search to the information processing apparatus 100 that made the request as data file division condition information.

The communication control unit 207 is configured of, for example, a CPU, ROM, RAM, communication device and the like. The communication control unit 207 exercises communication control of various kinds of data transmitted/received between the divided management server 200 and the information processing apparatus 100. More specifically, the communication control unit 207 receives a request from each processing unit contained on the divided management server 200 according to the present embodiment and transmits various kinds of data and signals to the information processing apparatus 100. The communication control unit 207 also receives various kinds of data and signals transmitted from the information processing apparatus 100 and transmits the data and signals to each processing unit contained on the divided management server 200 according to the present embodiment.

The communication control unit 207 can use the storage unit 209 described below as a buffer for transmission/reception.

The storage unit 209 has a data file division condition database concerning division conditions of data files divided for management among a plurality of information processing apparatuses recorded therein. The data file division condition database has information of items as shown, for example, in FIG. 11 recorded therein and each processing unit of the divided management server 200 can perform a search of content recorded in the database based on any item. For example, each processing unit performs a search of content based on data file identification information (file ID) so that it is possible to know the node ID of the information processing apparatus, which is a node holding the data file of the relevant file ID and held responsible blocks.

The storage unit 209 may also have various parameters that need to be saved when the divided management server 200 according to the present embodiment performs some process, progress of the process, or various databases recorded therein when appropriate. The division condition change unit 201, the holding block information transmission unit 203, the data file division condition information transmission unit 205, and the communication control unit 207 can freely write to/read from the storage unit 209.

In the foregoing, examples of the function of the divided management server 200 according to the present embodiment have been shown. Each of the above components may be constructed by using general-purpose members or circuits or by hardware specialized for the function of each component. Alternatively, the functions of components may all be performed by a CPU. Therefore, the configuration to be used can be changed as appropriate in accordance with the technical level when the present embodiment is carried out.

A computer program to realize each function of a divided management server according to the present embodiment as described above can be created and loaded into a personal computer. Alternatively, a computer readable recording medium in which such a computer program is stored can be provided. The recording medium may be a magnetic disk, optical disk, magneto-optical disk, flash memory or the like. Instead of using a recording medium, the above computer program may be delivered via a network.

<Information Processing Method and Divided Management Method>

Figure 13:
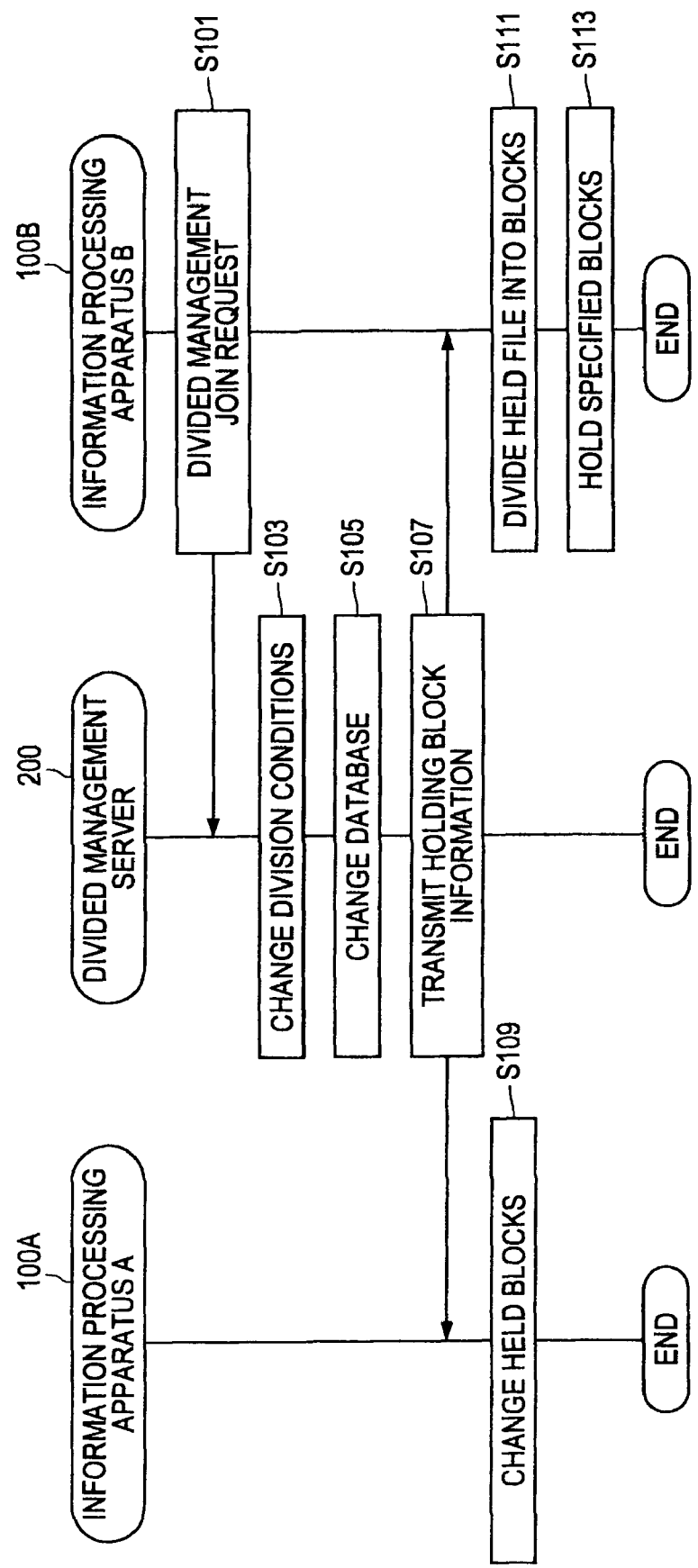
FIG. 13 is a flow chart illustrating an information processing method and a divided management method according to the embodiment.
Figure 14:
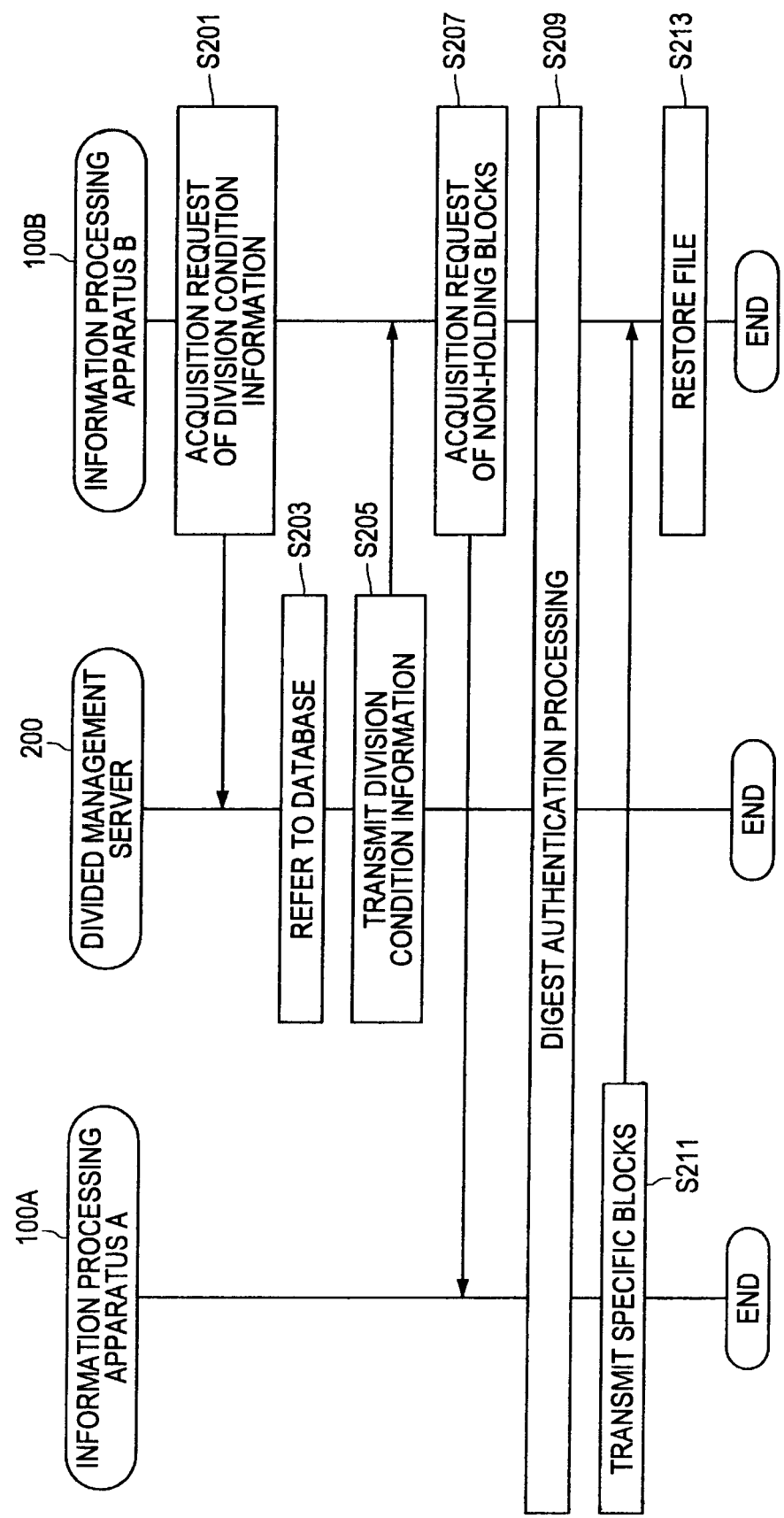
FIG. 14 is a flow chart illustrating an information processing method and a divided management method according to the embodiment.
Figure 15:
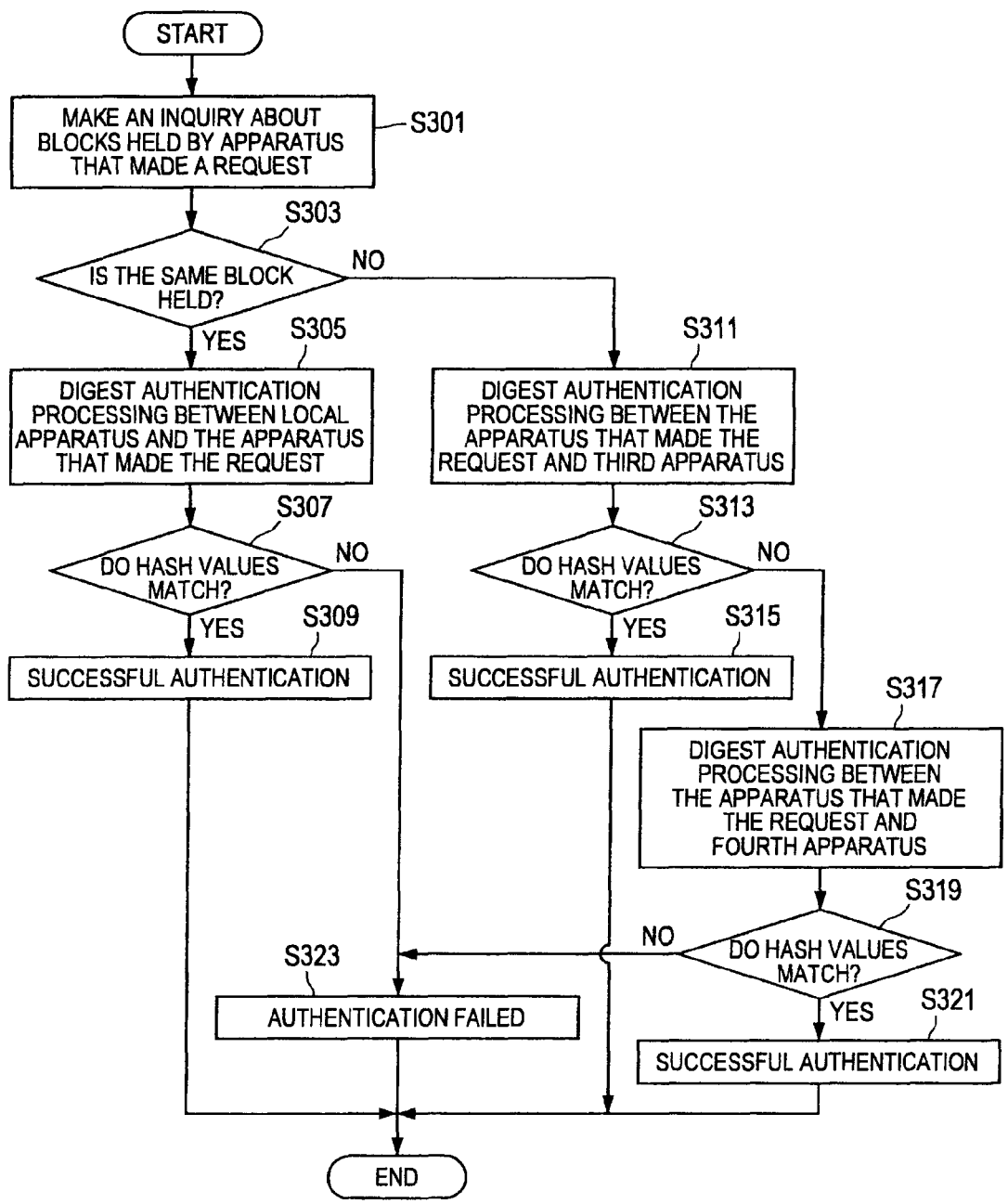
FIG. 15 is a flow chart illustrating the information processing method according to the embodiment.

Subsequently, the information processing method executed by the information processing apparatus 100 according to the present embodiment and the divided management method performed by the divided management server 200 according to the present embodiment will be described in detail with reference to FIGS. 13 to 15. FIGS. 13 and 14 are flow charts illustrating the information processing method and divided management method according to the present embodiment. FIG. 15 is a flow chart illustrating the information processing method according to the present embodiment.

[Flow when a Join Request to Divided Management is Made]

First, the information processing method and divided management method when a join request to divided management of a data file is made from one of the information processing apparatuses 100 will be described in detail with reference to FIG. 13. In the description that follows, it is assumed that the information processing apparatus A already joins divided management of a data file and the information processing apparatus B newly makes a join request to the divided management. While only the information processing apparatus A is illustrated in FIG. 13 as the information processing apparatus 100 that already joins the divided management, it is needless to say that a plurality of information processing apparatuses is actually present.

First, the divided management request unit 101 of the information processing apparatus B that desires to join divided management of a data file transmits a join request to divided management of a data file to the divided management server 200 (step S101). More specifically, the divided management request unit 101 generates data file identification information to identify the data file desired to join divided management using content of the data file desired to join divided management and a hash function decided in advance in the information processing system. Subsequently, the divided management request unit 101 transmits a join request to divided management to the divided management server 200 by attaching the generated data file identification information.

The division condition change unit 201 of the divided management server 200 that received the join request to divided management checks division conditions and the like of the data file requested to join in by referring to the data file division condition database based on data file identification information contained in the join request to divided management. Subsequently, the division condition change unit 201 changes division conditions in such a way that sharing among information processing apparatuses becomes fair (step S103). Accordingly, the division condition change unit 201 decides blocks to be held by each of the information processing apparatuses 100 and the data size of blocks to be held.

Subsequently, the division condition change unit 201 updates content of the data file division condition database concerning the relevant data file based on the changed division conditions (step S105). The division condition change unit 201 also transmits the division conditions after the change to the holding block information transmission unit 203.

Next, the holding block information transmission unit 203 transmits new holding block information to the information processing apparatus B that made the join request and the information processing apparatus A whose blocks to be held have changed based on the division conditions after the change (step S107).

The blocking unit 103 of the information processing apparatus A that received the holding block information changes holding blocks held by the local apparatus based on content written in the received holding block information (step S109).

The blocking unit 103 of the information processing apparatus B that received the holding block information divides the data file requested to join in based on content written in the received holding block information (step S111). Next, the blocking unit 103 records blocks to be held by the local apparatus based on content written in the holding block information as holding blocks (step S113).

With processing being performed according to the above procedure, each of the information processing apparatuses 100 can manage data files by dividing the data files, thereby reducing the capacity of data files held by the local apparatus. Moreover, by performing processing according to the above procedure, the divided management server 200 can manage division conditions of data files that are managed by being divided.

[Flow Concerning Acquisition of Non-holding Blocks]

Next, the information processing method and divided management method when one of the information processing apparatuses 100 acquires non-holding blocks will be described in detail with reference to FIG. 14. In the description that follows, it is assumed that the information processing apparatus B acquires non-holding blocks. While only the information processing apparatus A and the information processing apparatus B are illustrated in FIG. 14 as the information processing apparatuses 100 that join the divided management, it is needless to say that a plurality of information processing apparatuses is actually present.

To restore a data file that is managed by being divided, it is necessary for the information processing apparatus B to acquire blocks (don-holding blocks) that are nor held by the local apparatus from information processing apparatuses other than the local apparatus. First, the non-holding block acquisition unit 107 of the information processing apparatus B requests acquisition of data file division condition information of the data file to be restored from the divided management server 200 (step S201). More specifically, the non-holding block acquisition unit 107 requests transmission of data file division condition information from the divided management server 200 by attaching data file identification information of the data file stored in the storage unit 115 or the like and whose restoration is desired.

The data file division condition information transmission unit 205 of the divided management server 200 that received the acquisition request of data file division condition information refers to the data file division condition database based on the data file identification information attached to the acquisition request (step S203). By searching the database based on the data file identification information, the data file division condition information transmission unit 205 can grasp division conditions (that is, which information processing apparatus holds which blocks) of the relevant data file.

Subsequently, the data file division condition information transmission unit 205 transmits division condition information of the relevant data file obtained by referring to the database to the information processing apparatus B that made the request (step S205).

The non-holding block acquisition unit 107 that received the data file division condition information from the divided management server 200 identifies the information processing apparatuses 100 holding non-holding blocks that are not held by the local apparatus by referring to the data file division condition information. Subsequently, the non-holding block acquisition unit 107 transmits an acquisition request of non-holding blocks to each of the information processing apparatuses 100 holding non-holding blocks (step S207).

The authentication unit 111 of the information processing apparatus A that received the acquisition request of non-holding blocks authenticates whether the information processing apparatus B that transmitted the acquisition request holds blocks that should be held by the information processing apparatus B in a suitable format by digest authentication (step S209). The digest authentication processing will be described in detail again with reference to FIG. 15.

If authentication of the information processing apparatus B is successful, the authentication unit 111 of the information processing apparatus A determines that the information processing apparatus B holds blocks that should be held by the information processing apparatus B in a suitable format and transmits blocks of the specified data file to the information processing apparatus B (step S211). If authentication of the information processing apparatus B fails, the authentication unit 111 of the information processing apparatus A determines that the information processing apparatus B is not a valid node and does not transmit blocks of the specified data file.

When data files corresponding to blocks held by the information processing apparatus A are transmitted from the information processing apparatus A, the non-holding block acquisition unit 107 of the information processing apparatus B receives data files corresponding to the transmitted blocks. Subsequently, the non-holding block acquisition unit 107 transmits data files corresponding to the acquired non-holding blocks to the data file restoration unit 109.

While the information processing apparatus B transmits an acquisition request of non-holding blocks to the information processing apparatus A only in FIG. 14, if any other information processing apparatus holding non-holding blocks is present, the information processing apparatus B performs processing in the similar manner to acquire all non-holding blocks.

When all non-holding blocks are transmitted, the data file restoration unit 109 performs restoration processing of the file by acquiring data files corresponding to holding blocks held by the information processing apparatus B from the storage unit 115 (step S213).

By performing the above processing, an information processing apparatus can restore a data file managed by being divided.

[Flow Concerning Digest Authentication Processing]

Next, digest authentication processing performed by the authentication unit 111 of the information processing apparatus 100 that receives an acquisition request of non-holding blocks will be described in detail with reference to FIG. 15. In the description that follows, for the sake of convenience, the information processing apparatus that receives an acquisition request of non-holding blocks is denoted as the information processing apparatus A and the information processing apparatus that transmits an acquisition request as the information processing apparatus B.

The authentication unit 111 of the information processing apparatus A that received an acquisition request of non-holding blocks first makes an inquiry at the divided management server 200 about blocks held by the information processing apparatus B that made a request (step S301). More specifically, the authentication unit 111 transmits data file identification information corresponding to requested blocks and information to identify the information processing apparatus B to the divided management server 200 to acquire information about holding blocks of the information processing apparatus B as data file division condition information.

The authentication unit 111 that acquired the data file division condition information from the divided management server 200 determines whether the information processing apparatus B that made the acquisition request holds the same block as the local apparatus (the information processing apparatus A) by referring to the data file division condition information (step S303).

If the information processing apparatus B holds the same block as the information processing apparatus A, the authentication unit 111 of the information processing apparatus A performs digest authentication processing described below between the local apparatus (the information processing apparatus A) and the information processing apparatus B that made the request (step S305).

First, the authentication unit 111 of the information processing apparatus A specifies a block to the information processing apparatus B that is common to the information processing apparatus B (hereinafter, referred to also as a common block) and further transmits a byte range that specifies a portion of the common block and the parameter R, which is an immediately generated random number.

The non-holding block acquisition unit 107 of the information processing apparatus B acquires content corresponding to the specified byte range of the specified block from the storage unit 115 to generate a hash value of data that links the acquired data content and the specified random number R. Next, the non-holding block acquisition unit 107 returns the generated hash value to the information processing apparatus A.

The authentication unit 111 of the information processing apparatus A calculates a hash value in advance using the byte range and the random number R transmitted to the information processing apparatus B. When the hash value is replied from the information processing apparatus B, the authentication unit 111 of the information processing apparatus A compares the hash value calculated by the local apparatus and that transmitted from the information processing apparatus B (step S307).

If the hash value calculated by the local apparatus and that transmitted from the information processing apparatus B match, the authentication unit 111 of the information processing apparatus A determines that the digest authentication is successful (step S309). If the hash value calculated by the local apparatus and that transmitted from the information processing apparatus B do not match, the authentication unit 111 of the information processing apparatus A determines that the digest authentication failed (step 323).

On the other hand, if the information processing apparatus B does not hold the same block as the local apparatus, the authentication unit 111 of the information processing apparatus A performs digest authentication processing between the information processing apparatus B and a third information processing apparatus that is different from both the information processing apparatus A and the information processing apparatus B (step S311).

In this case, the authentication unit 111 of the information processing apparatus A first makes an inquiry at the divided management server 200 about whether the third information processing apparatus (hereinafter, referred to as the information processing apparatus C) holding a block in common with the information processing apparatus B is present. If no information processing apparatus C holding a block in common with the information processing apparatus B is present, the authentication unit 111 of the information processing apparatus A determines that the authentication failed. If the information processing apparatus C is present, the authentication unit 111 of the information processing apparatus A specifies a block to the information processing apparatuses B and C that is common to both and further transmits a byte range that specifies a portion of the common block and the parameter R, which is an immediately generated random number. Each of the information processing apparatuses B and C acquires content corresponding to the specified byte range of the specified block from the storage unit 115 to generate a hash value of data that links the acquired data content and the specified random number R. Next, each of the information processing apparatuses B and C returns the generated hash value to the information processing apparatus A.

The authentication unit 111 of the information processing apparatus A determines whether hash values transmitted from the information processing apparatuses B and C match (step S313). If the hash values match, the authentication unit 111 of the information processing apparatus A determines that the authentication is successful (step S315). If hash values transmitted from the information processing apparatuses B and C do not match, the authentication unit 111 of the information processing apparatus A determines that at least one of the information processing apparatuses B and C is an invalid node. Thus, the authentication unit 111 of the information processing apparatus A checks whether the fourth information processing apparatus (hereinafter, referred to as the information processing apparatus D) holding another block held by the information processing apparatus B is present. Then, the authentication unit 111 of the information processing apparatus A performs digest authentication processing between the information processing apparatus B and the information processing apparatus D in the similar manner as at step S311 (step S317) and compares hash values (step S319).

If hash values transmitted from the information processing apparatuses B and D match, the authentication unit 111 of the information processing apparatus A determines that the authentication is successful (step S321). If hash values do not match, the authentication unit 111 of the information processing apparatus A determines that the information processing apparatus B is an invalid node and determines that the authentication failed (step S323).

By performing the above processing, the information processing apparatus 100 can determine whether an information processing apparatus that transmits an acquisition request of non-holding blocks is a valid node.

<First Modification>

In the above embodiment, a case in which a data file is divided for management by arranging the divided management server 200 that manages division conditions of data files in each of the information processing apparatuses 100 has been described. However, as shown, for example, in FIG. 16, a serverless information processing system can be realized if the data file division condition database held by the divided management server 200 itself is distributed and managed and each of the information processing apparatuses 100 holds the function of the divided management server 200.

Figure 16:
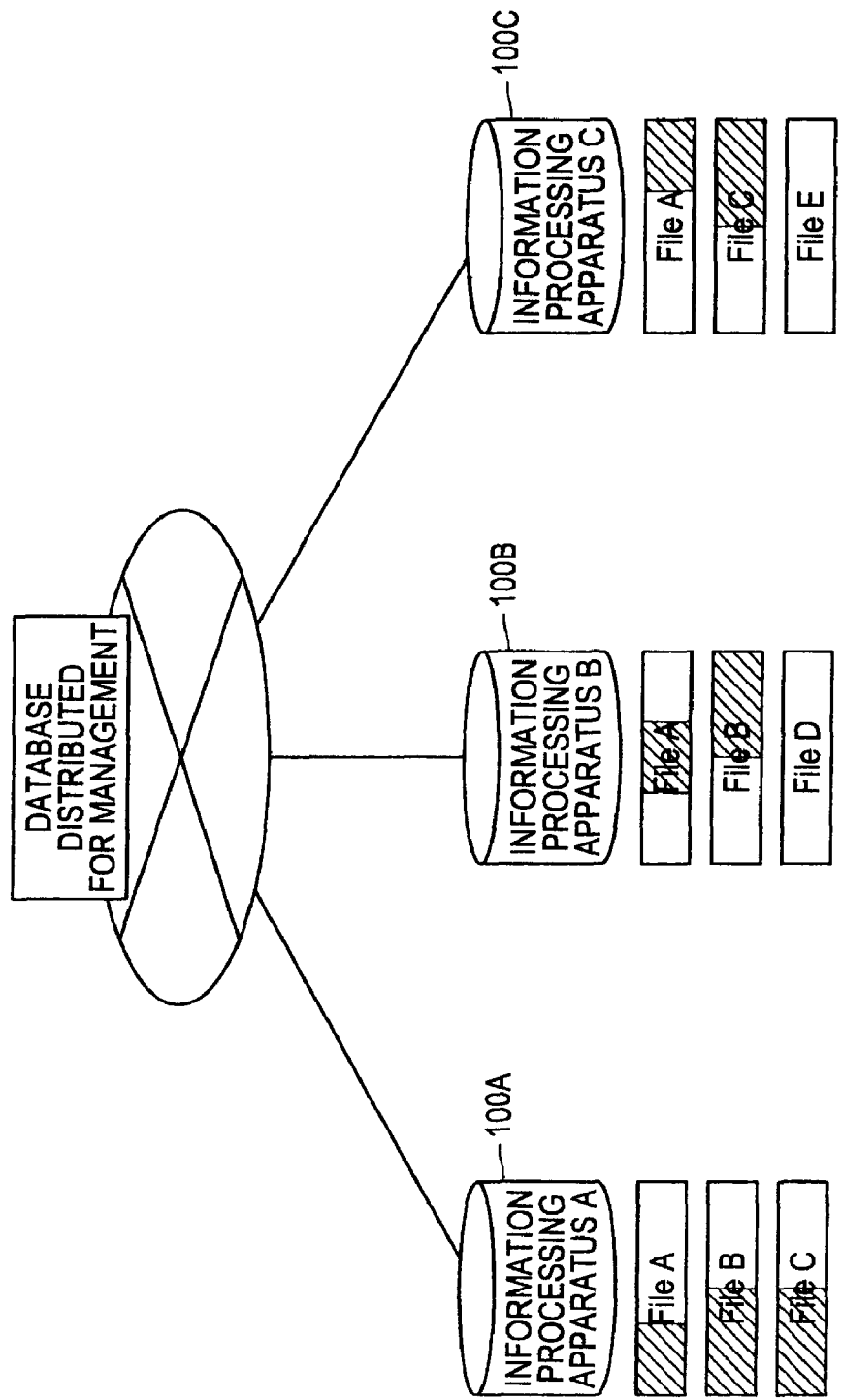
FIG. 16 is an explanatory view illustrating a first modification of the information processing system according to the embodiment.

As shown, for example, in FIG. 16, there are many methods of distributed management of a database itself and any method can be used in accordance with various conditions necessary for an information processing system. A serverless information processing system will be described below in detail by taking a case in which a distributed hash table is used as an example.

Various methods of a distributed hash table such as a method called Chord using a circular skip list, a method using an N-dimensional truss, and a method using a binary tree are known and the description below takes a case of Chord as an example.

When the method called Chord is used, it is necessary for each of the information processing apparatuses 100 to have a unique identification number (ID) attached thereto. The identification number can automatically be generated using a MAC address or the like. It is preferable that the identification number have a sufficiently large address space and the address space be equal to that of output values of hash functions used for generation of data file identification information and digest authentication processing.

In this case, each of the information processing apparatuses 100 manages content (hereinafter, referred to also as records) recorded in the data file division condition database whose hash value of data file identification information is the nearest to the value of the identification number attached to the local apparatus. The information processing apparatus 100 that needs content of the database makes an inquiry about content of the database at the information processing apparatus having the identification number nearest to the hash value of data file identification information. Therefore, in the example described below, each of the information processing apparatuses 100 holds a route table represented by a circular skip list in advance. Each of the information processing apparatuses 100 also makes an inquiry at the relevant information processing apparatus 100 based on the data file identification information and the block number to be searched for to acquire the identification number of the information processing apparatus 100 holding an intended block.

[Configuration of an Information Processing Apparatus in the Present Modification]

Figure 17:
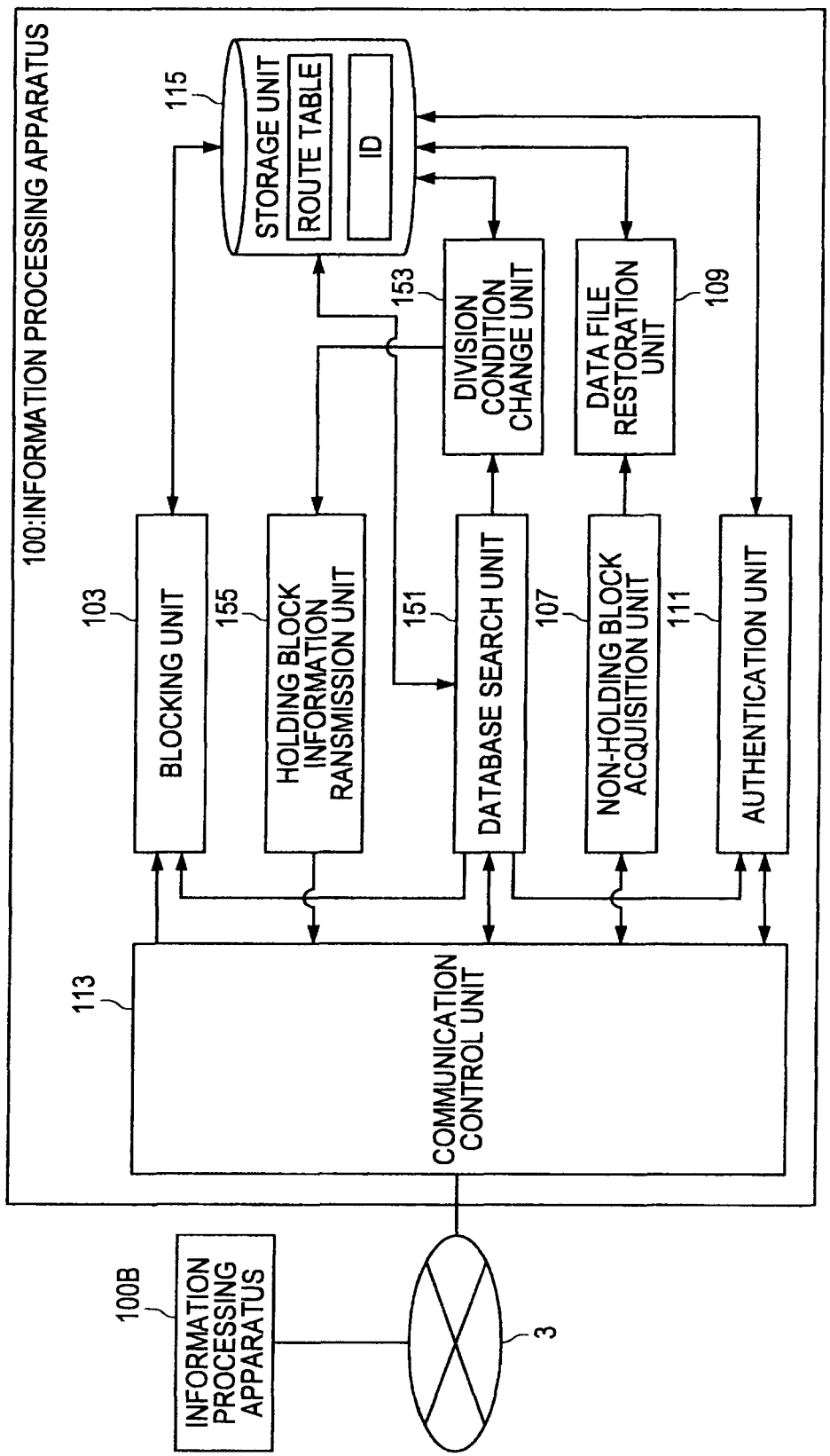
FIG. 17 is a block diagram illustrating the configuration of the information processing apparatus according to the modification.

The configuration of an information processing apparatus according to the present modification will be described below in detail with reference to FIG. 17. FIG. 17 is a block diagram illustrating the function of an information processing apparatus according to the present modification.

The information processing apparatus 100 according to the present modification includes, as shown, for example, in FIG. 17, the blocking unit 103, the non-holding block acquisition unit 107, the data file restoration unit 109, the authentication unit 111, the communication control unit 113, and the storage unit 115. Further, the information processing apparatus 100 according to the present modification includes a database search unit 151, a division condition change unit 153, and a holding block information transmission unit 155.

First, the blocking unit 103, the non-holding block acquisition unit 107, the data file restoration unit 109, and the authentication unit 111 according to the present modification will be described. These processing units have the similar functions as those of the processing units of the information processing apparatus 100 in the above embodiment and the same effect except that information acquired by the database search unit 151 described below is used when necessary. Therefore, a detailed description thereof is omitted in the present modification.

The communication control unit 113 in the present modification also has the similar function as that of the communication control unit 113 contained in the information processing apparatus 100 according to the present embodiment and the similar effect. Therefore, a detailed description thereof is omitted in the present modification.

The storage unit 115 has blocks of data files that should be held by the information processing apparatus 100 according to the present modification recorded by being associated with data file identification information, which is information to identify each data file. Accordingly, regarding a data file that is divided for management with the other information processing apparatuses 100, only data files corresponding to blocks to be held by the local apparatus are recorded in the storage unit 115. Further, the identification number (ID) uniquely attached to the local apparatus and a route table used for a distributed hash table are recorded in the storage unit 115. The storage unit 115 may also have a utilization history of data files held by being divided into blocks recorded therein.

Moreover, various parameters that need to be saved when the information processing apparatus 100 according to the present modification performs some process, progress of the process, or various databases may be recorded in the storage unit 115 when appropriate. The blocking unit 103, the non-holding block acquisition unit 107, the data file restoration unit 109, the authentication unit 111, the communication control unit 113, the database search unit 151, the division condition change unit 153, and the holding block information transmission unit 155 can freely write to/read from the storage unit 115.

The database search unit 151 is configured of, for example, a CPU, ROM, RAM and the like. When an acquisition request concerning content of the data file division condition database is transmitted from each processing unit of the information processing apparatus 100 according to the present modification, the database search unit 151 performs a search of a database that is distributed and managed by a plurality of the information processing apparatuses 100.

To search a database that is distributed and managed, the database search unit 151 obtains identification information of the data file whose search is desired transmitted thereto. The database search unit 151 identifies the information processing apparatus 100 having the identification number (node ID) nearest to the identification information of the data file based on the route table recorded in the storage unit 115 or the like. When the information processing apparatus 100 having the identification number nearest to the identification information of the data file, the database search unit 151 transmits data file identification information and information about blocks to the information processing apparatus 100 to make an inquiry about content of the database. Accordingly, the database search unit 151 can grasp, for example, the identification number (node ID) of the information processing apparatus 100 holding non-holding blocks whose acquisition is desired. The database search unit 151 transmits acquired information to a processing unit that transmitted an acquisition request concerning content of the database.

Subsequently, the division condition change unit 153 and the holding block information transmission unit 155 will be described. These processing units have the similar functions as those of the division condition change unit 201 and the holding block information transmission unit 203 of the divided management server 200 and the similar effect except that information acquired by the database search unit 151 is used by these processing units when necessary. Therefore, a detailed description thereof is omitted in the present modification.

In the foregoing, examples of the function of the information processing apparatus 100 according to the present modification have been shown. Each of the above components may be constructed by using general-purpose members or circuits or by hardware specialized for the function of each component. Alternatively, the functions of components may all be performed by a CPU. Therefore, the configuration to be used can be changed as appropriate in accordance with the technical level when the present modification is carried out.

A computer program to realize each function of an information processing apparatus according to the present modification as described above can be created and loaded into a personal computer. Alternatively, a computer readable recording medium in which such a computer program is stored can be provided. The recording medium may be a magnetic disk, optical disk, magneto-optical disk, flash memory or the like. Instead of using a recording medium, the above computer program may be delivered via a network.

<Hardware Configuration>

Figure 18:
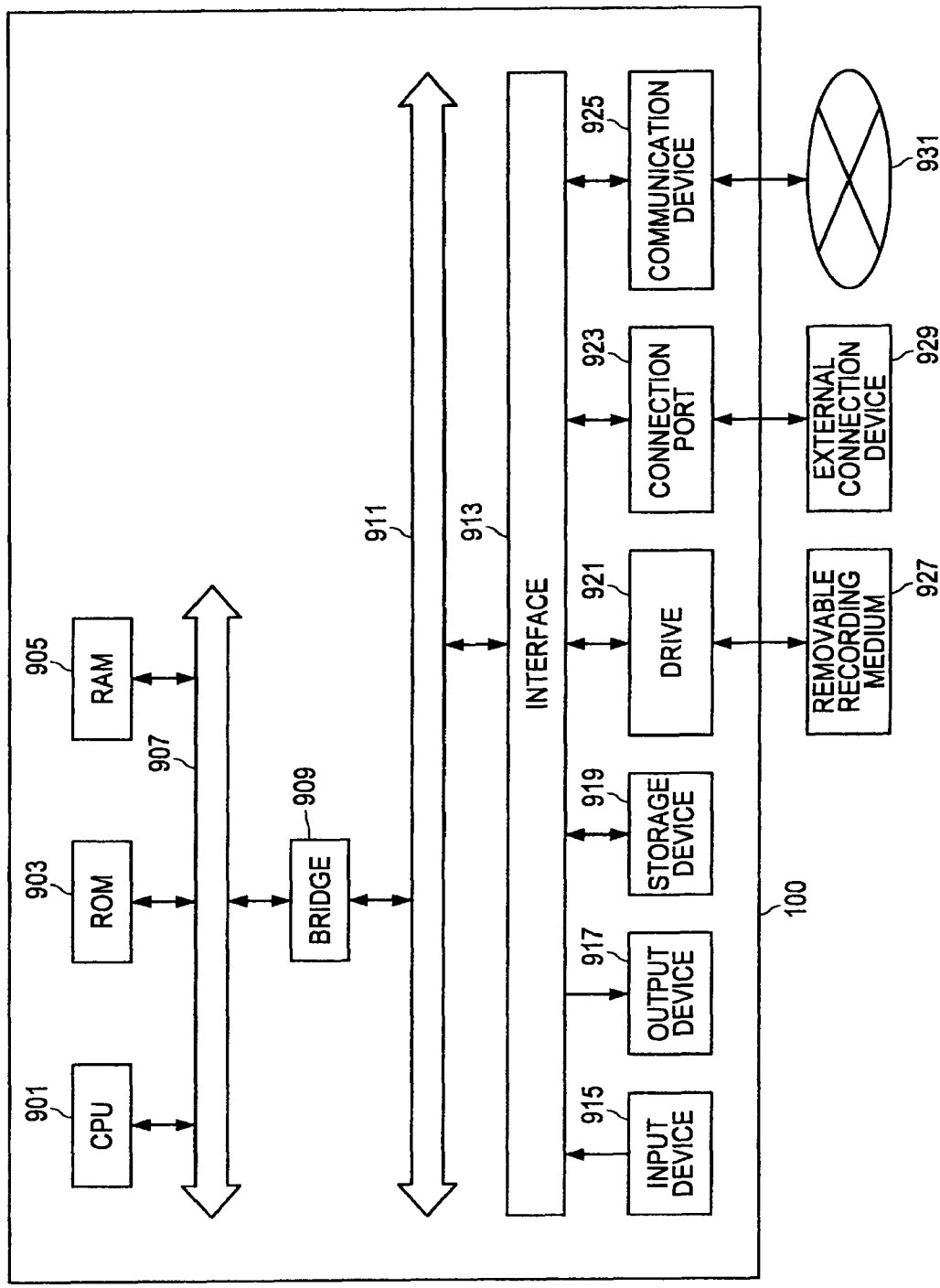
FIG. 18 is a block diagram illustrating a hardware configuration of the information processing apparatus according to each embodiment of the present invention.

Next, the hardware configuration of the information processing apparatus 100 according to each embodiment of the present invention will be described in detail with reference to FIG. 18. FIG. 18 is a block diagram illustrating the hardware configuration of the information processing apparatus 100 according to each embodiment of the present invention.

The information processing apparatus 100 mainly includes a CPU 901, a ROM 903, and a RAM 905. Further, the information processing apparatus 100 includes a host bus 907, a bridge 909, an external bus 911, an interface 913, an input device 915, an output device 917, a storage device 919, a drive 921, a connection port 923, and a communication device 925.

The CPU 901 functions as an arithmetic processing device and a control device and controls an overall operation in the information processing apparatus 100 or a portion thereof according to various programs recorded in the ROM 903, the RAM 905, the storage device 919, or a removable recording medium 927. The ROM 903 stores programs and operation parameters used by the CPU 901. The RAM 905 temporarily stores programs used for execution of the CPU 901 and parameters and the like that change as appropriate during execution thereof. These units are mutually connected by the host bus 907 configured of an internal bus such as a CPU bus.

The host bus 907 is connected to the external bus 911 such as a PCI (Peripheral Component Interconnect/Interface) bus via the bridge 909.

The input device 915 is an operation means operated by the user such as a mouse, keyboard, touch panel, button, switch, and lever. The input device 915 may also be a remote control means (the so-called remocon) using infrared rays or other radio waves or an externally connected device 929 such as a mobile phone and PDA compatible with operations of the information processing apparatus 100. Further, the input device 915 is configured of, for example, an input control circuit that generates an input signal based on information input by the user using the above operation means and outputs the input signal to the CPU 901. The user of the information processing apparatus 100 can input various kinds of data into the information processing apparatus 100 and provide instructions of processing operation by operating the input device 915.

The output device 917 is configured of a device capable of visually or aurally notifying the user of acquired information. Such devices include, for example, a display device such as a CRT display device, liquid crystal display device, plasma display device, EL display device, and lamp, audio output device such as a speaker and headphone, printer device, mobile phone, and facsimile. The output device 917 outputs, for example, results obtained by various kinds of processing performed by the information processing apparatus 100. More specifically, the display device displays, for example, results obtained by various kinds of processing performed by the information processing apparatus 100 as text or images. The audio output device, on the other hand, outputs an audio signal configured of reproduced audio data, acoustic data and the like after the audio signal being converted into an analog signal.

The storage device 919 is a device for data storage constituted as an example of the storage unit of the information processing apparatus 100. The storage device 919 is configured of, for example, a magnetic storage device such as an HDD (Hard Disk Drive), semiconductor storage device, optical storage device, magneto-optical storage device or the like. The storage device 919 stores programs executed by the CPU 901, various kinds of data, and also various kinds of data acquired from outside.

The drive 921 is a reader/writer for recording media and is added to the information processing apparatus 100 internally or externally. The drive 921 reads information recorded in the removable recording medium 927 such as an inserted magnetic disk, optical disk, magneto-optical disk, and semiconductor memory and outputs the information to the RAM 905. The drive 921 can also write a record into the removable recording medium 927 such as an inserted magnetic disk, optical disk, magneto-optical disk, and semiconductor memory. The removable recording medium 927 is, for example, a DVD medium, HD-DVD medium, or Blu-ray medium. The removable recording medium 927 may also be CompactFlash (CF) (registered trademark), a memory stick, or SD memory card (Secure Digital memory card). The removable recording medium 927 may also be, for example, an IC card (Integrated Circuit card) on which a non-contact IC chip is mounted, electronic device or the like.

The connection port 923 is a port to directly connect devices to the information processing apparatus 100. Examples of the connection port 923 include a USB (Universal Serial Bus) port, IEEE1394 port such as i. Link, and SCSI (Small Computer System Interface) port. Other examples of the connection port 923 include an RS-232C port, optical audio terminal, and HDMI (High-Definition Multimedia Interface) port. By connecting the externally connected device 929 to the connection port 923, the information processing apparatus 100 can acquire various kinds of data directly from the externally connected device 929 or provide various kinds of data to the externally connected device 929.

The communication device 925 is a communication interface configured of, for example, a communication device to connect to a communication network 931. The communication device 925 is, for example, a communication card for a wire or wireless LAN (Local Area Network). Bluetooth or WUSB (Wireless USB). The communication device 925 may also be a router for optical communication, router for ADSL (Asymmetric Digital Subscriber Line), or modem for various kinds of communication. For example, the communication device 925 can transmit/receive a signal or the like to/from the Internet and other communication devices according to a predetermined protocol such as TCP/IP. The communication network 931 connected to the communication device 925 is configured of a network or the like connected by wire or by radio and may be, for example, the Internet, a home LAN, infrared-ray communication, radio wave communication, or satellite communication.

In the foregoing, an example of the hardware configuration that can realize the function of the information processing apparatus 100 according to each embodiment of the present invention has been illustrated. Each of the above components may be constructed by using general-purpose members or by hardware specialized for the function of each component. Therefore, the hardware configuration to be used can be changed as appropriate in accordance with the technical level when the present embodiment is carried out.

<Summary>

According to an information processing system according to each embodiment of the present invention, as described above, when a plurality of the information processing apparatuses 100 holds a data file of the same content, the size (capacity) of the data file to be held by one information processing apparatus can be reduced. Such an information processing system is effective for apparatuses holding content data that has a small number of types and a large size. Examples of content data that has a small number of types and a large size include, for example, VoD (Video on Demand) provided/delivered content data, recorded content data, and game data. Moreover, an information processing system according to each embodiment of the present invention has an advantage that the compression ratio of a data file increases with an increasing number of apparatuses holding content, that is, content of a so-called major title.

Since the digest authentication processing described above is performed for transmission of non-holding blocks in an information processing system according to each embodiment of the present invention, an information processing apparatus having no original data file is denied to join divided management of the data file.

Moreover, since predetermined redundancy can be guaranteed when data files are divided for management, even if a portion of data is lost in some information processing apparatus, the data file can easily be restored. Thus, an information processing system according to each embodiment of the present invention can provide usability like RAID to the user.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2008-308800 filed in the Japan Patent Office on 3 Dec. 2008, the entire content of which is hereby incorporated by reference.

What is claimed is:

1. An information processing apparatus, comprising:
a blocking unit including a processor that acquires holding block information, which is information about blocks to be held by a local apparatus, about a data file divided into a plurality of blocks among other information processing apparatuses excluding the local apparatus for divided management and held by the local apparatus and divides the data file to be held by the local apparatus based on the holding block information;
a storage unit that records the blocks of the data file identified by the holding block information with the blocks associated with data file identification information, which is information to identify the data file;
a data file division condition information acquisition unit that acquires data file division condition information representing division conditions of the data file held by the local apparatus among other information processing apparatuses holding the data file from a predetermined data file division condition database;
a non-holding block acquisition unit that acquires data files of the blocks not held by the local apparatus from among the plurality of blocks from the other information processing apparatuses; and
a data file restoration unit that restores the data file using the data files corresponding to non-holding blocks acquired by the non-holding block acquisition unit and data files corresponding to blocks held by the local apparatus, wherein
the data file division condition information acquisition unit acquires the data file division condition information about the data file to be restored from the data file division condition database, and
the non-holding block acquisition unit acquires non-holding blocks from the other information processing apparatuses based on the data file division condition information about the data file to be restored.

2. The information processing apparatus according to claim 1, wherein the plurality of blocks is held by the local apparatus and the other information processing apparatuses by providing redundancy.

3. The information processing apparatus according to claim 2, wherein a data size $D_{CX}$ of the blocks held by the local apparatus is a size calculated based on Formula 1 below:

$$D_{CX} = \left(\beta - \frac{\beta - 1}{N_C}\right) \times \frac{D_C}{N_C} \quad \text{(Formula 1)}$$

where $D_{CX}$ in Formula 1 above is the data size of the blocks held by the local apparatus, $N_C$ is a number of information processing apparatuses including the local apparatus holding a data file C, $\beta$ is a redundancy coefficient ($\beta > 1$), and $D_C$ is the data size of the data file C.

4. The information processing apparatus according to claim 2, wherein a data size $D_{CX}$ of the blocks held by the local apparatus is a size calculated based on Formula 2 below:

$$D_{CX} = \{(N_C - \beta_N) \cdot \alpha_X + \beta_N\} \times \frac{D_C}{N_C} \quad \text{(Formula 2)}$$

$$\beta_N = \beta - \frac{\beta - 1}{N_C} \quad \text{(Formula 3)}$$

where $D_{CX}$ in Formula 2 above is the data size of blocks held by the local apparatus, $N_C$ is a number of information processing apparatuses including the local apparatus holding a data file C, $\alpha_X$ is a utilization frequency ($0 \leq \alpha_X \leq 1$) of the data file C by the local apparatus, $\beta_N$ is a redundancy coefficient calculated by Formula 3 using a redundancy coefficient ($\beta > 1$), and $D_C$ is the data size of the data file C.

5. The information processing apparatus according to claim 1, wherein the data file division condition database is held by a divided management server to which the local apparatus and the other information processing apparatuses can be connected.

6. The information processing apparatus according to claim 1, wherein the data file division condition database is held by the local apparatus and the other information processing apparatuses by being divided.

7. The information processing apparatus according to claim 6, wherein the data file division condition database is held by the local apparatus and the other information processing apparatuses by being divided using a distributed hash table.

8. The information processing apparatus according to claim 7, wherein the information processing apparatus holds a route table concerning the data file division condition database held by each of the local apparatus and the other information processing apparatuses and identifies the other information processing apparatuses holding the non-holding blocks using the data file identification information of the data file to be restored and unique identifies assigned to the local apparatus and the other information processing apparatuses in advance.

9. The information processing apparatus according to claim 1, further comprising an authentication unit that, when an acquisition request of the block held by the local apparatus is transmitted from the other information processing apparatus, authenticates the other information processing apparatus based on whether the other information processing apparatus holds the data file in a suitable format, wherein
the authentication unit authenticates the other information processing apparatus by digest authentication using the holding block information.

10. The information processing apparatus according to claim 9, wherein the authentication unit
decides a parameter R randomly and transmits information to identify at least a portion of the data file held by the local apparatus and corresponding to a block that should be held by the other information processing apparatus that transmitted the acquisition request of the block and the parameter R to the other information processing apparatus that made the acquisition request of the block and
compares a hash value calculated by the other information processing apparatus that transmitted the acquisition request of the block by using the transmitted information to identify at least a portion of the data file and the parameter R and a hash value calculated by the local apparatus by using the transmitted information to identify at least a portion of the data file and the parameter R.

11. The information processing apparatus according to claim 9, wherein the authentication unit
acquires the holding block information about the blocks that should be held by the other information processing apparatus that transmitted the acquisition request of the block and information about a third information processing apparatus holding a block that should be held by the other information processing apparatus from the data file division condition database,
transmits a randomly decided parameter R to the other information processing apparatus and the third information processing apparatus and makes a request to calculate a hash value using the parameter R and at least a portion of the block held by each of the other information processing apparatus and the third information processing apparatus, and
compares the hash value transmitted from the other information processing apparatus and the hash value transmitted from the third information processing apparatus.

12. The information processing apparatus according to claim 1, wherein the data file identification information is a hash value of the data file.

13. The information processing apparatus according to claim 1, wherein the information processing apparatus automatically performs blocking processing of all data files held by the local apparatus.

14. An information processing method, comprising the steps of:
acquiring holding block information, which is information about blocks to be held by a local apparatus, about a data file divided into a plurality of blocks among other information processing apparatuses excluding the local apparatus for divided management and held by the local apparatus and dividing the data file to be held by the local apparatus based on the holding block information;
storing the blocks of the data file identified by the holding block information with the blocks associated with data file identification information, which is information to identify the data file;
acquiring data file division condition information representing division conditions of the data file held by the local apparatus among other information processing apparatuses holding the data file from a predetermined data file division condition database;
acquiring data files of the blocks not held by the local apparatus from among the plurality of blocks from the other information processing apparatuses; and
restoring the data file using the data files corresponding to acquired non-holding blocks and data files corresponding to blocks held by the local apparatus, wherein
the data file division condition information about the data file to be restored is acquired from the data file division condition database, and
the acquired non-holding blocks are acquired from the other information processing apparatuses based on the data file division condition information about the data file to be restored.

15. A non-transitory, computer-readable storage medium storing a program that, when executed by a processor, causes a computer communicable with other information processing apparatuses to perform a method, the method comprising:
acquiring holding block information, which is information about blocks to be held by a local apparatus, about a data file divided into a plurality of blocks among other information processing apparatuses excluding the local apparatus for divided management and held by the local apparatus and dividing the data file to be held by the local apparatus based on the holding block information;
storing the blocks of the data file identified by the holding block information with the blocks associated with data file identification information, which is information to identify the data file;
acquiring data file division condition information representing division conditions of the data file held by the local apparatus among other information processing apparatuses holding the data file from a predetermined data file division condition database;
acquiring data files of the blocks not held by the local apparatus from among the plurality of blocks from the other information processing apparatuses; and
restoring the data file using the data files corresponding to acquired non-holding blocks and data files corresponding to blocks held by the local apparatus, wherein
the data file division condition information about the data file to be restored is acquired from the data file division condition database, and
the acquired non-holding blocks are acquired from the other information processing apparatuses based on the data file division condition information about the data file to be restored.

16. An information processing system, including:
an information processing apparatus, comprising:
a blocking unit including a processor that acquires holding block information, which is information about blocks to be held by a local apparatus, about a data file divided into a plurality of blocks among other information processing apparatuses excluding the local apparatus for divided management and held by the local apparatus and divides the data file to be held by the local apparatus based on the holding block information;
a storage unit that records the blocks of the data file identified by the holding block information with the blocks associated with data file identification information, which is information to identify the data file;

a data file division condition information acquisition unit that acquires data file division condition information representing division conditions of the data file held by the local apparatus among other information processing apparatuses holding the data file from a predetermined data file division condition database;

a non-holding block acquisition unit that acquires data files of the blocks not held by the local apparatus from among the plurality of blocks from the other information processing apparatuses; and a data file restoration unit that restores the data file using the data files corresponding to non-holding blocks acquired by the non-holding block acquisition unit and data files corresponding to blocks held by the local apparatus, wherein the data file division condition information acquisition unit acquires the data file division condition information about the data file to be restored from the data file division condition database, and the non-holding block acquisition unit acquires non-holding blocks from the other information processing apparatuses based on the data file division condition information about the data file to be restored, and a divided management server, including:

a storage unit in which a data file division condition database concerning division conditions of a data file divided for management among a plurality of information processing apparatuses is recorded;

a division condition change unit including a processor that, when a join request to divided management of the data file is transmitted from one information processing apparatus, changes the division conditions of the data file requested to join in and managed by being divided into a plurality of blocks and updates the data file division condition database; and a holding block information transmission unit that transmits holding block information, which is information about the blocks to be held, to the information processing apparatuses whose division conditions have changed based on the division conditions of the data file after being changed.

* * * * *